(12) United States Patent
Kim

(10) Patent No.: US 12,482,509 B2
(45) Date of Patent: Nov. 25, 2025

(54) MEMORY DEVICE FOR PERFORMING TARGET REFRESH OPERATION, MEMORY SYSTEM AND OPERATING METHOD OF MEMORY SYSTEM

(71) Applicant: SK hynix Inc., Gyeonggi-do (KR)

(72) Inventor: Saeng Hwan Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 161 days.

(21) Appl. No.: 18/527,371

(22) Filed: Dec. 4, 2023

(65) Prior Publication Data

US 2024/0339146 A1    Oct. 10, 2024

(30) Foreign Application Priority Data

Apr. 6, 2023 (KR) .................. 10-2023-0045240
Aug. 18, 2023 (KR) .................. 10-2023-0108190

(51) Int. Cl.
*G11C 11/406*    (2006.01)
*G11C 11/4096*    (2006.01)

(52) U.S. Cl.
CPC .. *G11C 11/40615* (2013.01); *G11C 11/40622* (2013.01); *G11C 11/4096* (2013.01)

(58) Field of Classification Search
CPC ................ G11C 11/40615; G11C 11/406
USPC .................................................. 365/222
See application file for complete search history.

(56) References Cited

U.S. PATENT DOCUMENTS

| | | | |
|---|---|---|---|
| 2017/0062038 A1* | 3/2017 | Doo | G11C 11/40603 |
| 2022/0189535 A1* | 6/2022 | Kim | G11C 11/4078 |
| 2022/0189537 A1* | 6/2022 | Kim | G06F 3/0644 |
| 2022/0197542 A1 | 6/2022 | Meier et al. | |
| 2022/0375509 A1 | 11/2022 | Meier et al. | |

FOREIGN PATENT DOCUMENTS

KR    10-2019-0128890 A    11/2019

* cited by examiner

*Primary Examiner* — Muna A Techane
(74) *Attorney, Agent, or Firm* — IP & T GROUP LLP

(57) ABSTRACT

A memory system includes: a memory controller configured to: issue a normal refresh command and a refresh management command, and adjust, based on a replacement counting value, an issuance frequency of at least one of the normal refresh command and the refresh management command; and a memory device configured to: perform a first refresh operation corresponding to the normal refresh h command and a second refresh operation corresponding to the refresh management command, and replace the second refresh operation with the first refresh operation according to a memory information signal, count a number of times of the replacing to generate the replacement counting value, and provide the replacement counting value.

26 Claims, 15 Drawing Sheets

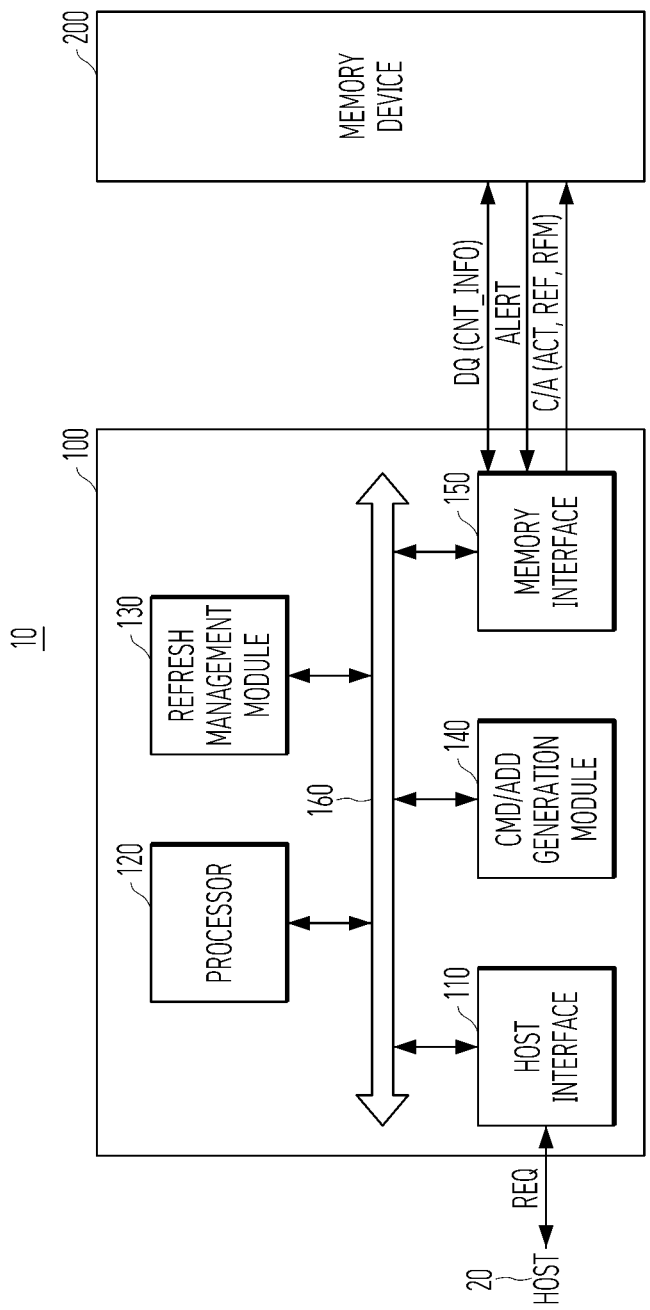

MEMORY DEVICE FOR PERFORMING TARGET REFRESH OPERATION, MEMORY SYSTEM AND OPERATING METHOD OF MEMORY SYSTEM

CROSS-REFERENCE TO RELATED APPLICATIONS

The present application claims priority to Korean Patent Application Nos. 10-2023-0045240 and 10-2023-0108190, respectively filed on Apr. 6, 2023 and Aug. 18, 2023, which are incorporated herein by reference in their entirety.

BACKGROUND

1. Field

Various embodiments of the present invention relate to a semiconductor designing technology, and more particularly, to a memory system including a memory device that performs a target refresh operation for mitigation of row-hammer.

2. Description of the Related Art

In addition to a normal refresh operation that is sequentially performed on memory cells of a plurality of word lines, an additional refresh operation which will be, hereinafter, referred to as a 'target refresh operation', is being performed on memory cells of a specific word line that is likely to lose data due to a row-hammer phenomenon. The row-hammer phenomenon refers to a phenomenon in which data of memory cells coupled to a specific word line or the word lines disposed adjacent to the word line are damaged due to a high number of accesses (or activations) of the corresponding word line. To prevent the row-hammer phenomenon, a target refresh operation is performed on a word line that is activated more than a predetermined number of times and word lines disposed adjacent to that word line.

Recently, a memory controller has provided a refresh command (hereinafter, referred to as a refresh management command) to a memory device to instruct a target refresh operation, in addition to a normal refresh command that instructs to perform a normal refresh operation. Accordingly, a method of efficiently performing a target refresh operation by a memory device has been studied.

SUMMARY

Embodiments of the present invention are directed to a memory system in which a memory device may replace a target refresh operation to be performed according to a refresh management command, with a normal refresh operation, and a memory controller may adjust a frequency of issuance of the refresh management command or the normal refresh command based on the replaced number of times.

According to an embodiment of the present invention, a memory system includes a memory controller configured to: issue a normal refresh command and a refresh management command, and adjust, based on a replacement counting value, an issuance frequency of at least one of the normal refresh command and the refresh management command; and a memory device configured to: perform a first refresh operation corresponding to the normal refresh command and a second refresh operation corresponding to the refresh management command, and replace the second refresh operation with the first refresh operation according to a memory information signal, count a number of times of the replacing to generate the replacement counting value, and provide the replacement counting value.

According to an embodiment of the present invention, a memory device includes a memory cell region including a plurality of rows; a control circuit configured to: perform a first refresh operation on the memory cell region according to a normal refresh command and a second refresh operation on the memory cell region according to the refresh management command, replace the second refresh operation with the first refresh operation, and count a number of times of the replacing to generate a replacement counting value; and a storage circuit configured to store the replacement counting value and output the stored replacement counting value to outside according to a readout command.

According to an embodiment of the present invention, an operating method of a memory system includes issuing, by a memory controller, a normal refresh command or a refresh management command; performing, by a memory device, a first refresh operation corresponding to the normal refresh command or a second refresh operation corresponding to the refresh management command while replacing the first refresh operation with the second refresh operation according to a memory information signal; counting, by the memory device, a number of times of the replacing to generate a replacement counting value; providing, by the memory device, the replacement counting value; and adjusting, by the memory controller, an issuance frequency of at least one of the normal refresh command and the refresh management command based on the replacement counting value.

According to an embodiment of the present invention, an operating method of a memory system includes performing each of normal and target refresh operations on a memory device included in the memory system, wherein the normal refresh operation is performed instead of the target refresh operation, even when the target refresh operation is to be performed, based on at least one or more of a number of times that each memory region is activated within the memory device and a number of times that an aggressor row for the target refresh operation is activated, and wherein one of the normal and target refresh operations is performed at a frequency depending on a first number of times that the normal refresh operation is performed instead of the target refresh operation. The target refresh operation may be halted, even when the target refresh operation is to be performed, by a second number of times when the first number reaches a threshold.

According to embodiments of the present invention, the memory system may reduce the likelihood of the row-hammer occurrence while reducing the power consumption thereof.

These and other features and advantages of the invention will become apparent from the detailed description of embodiments of the invention and the following figures.

BRIEF DESCRIPTION OF THE DRAWINGS

FIG. 1 is a block diagram illustrating a memory system in accordance with an embodiment of the present invention.

DETAILED DESCRIPTION

Figure 2A:
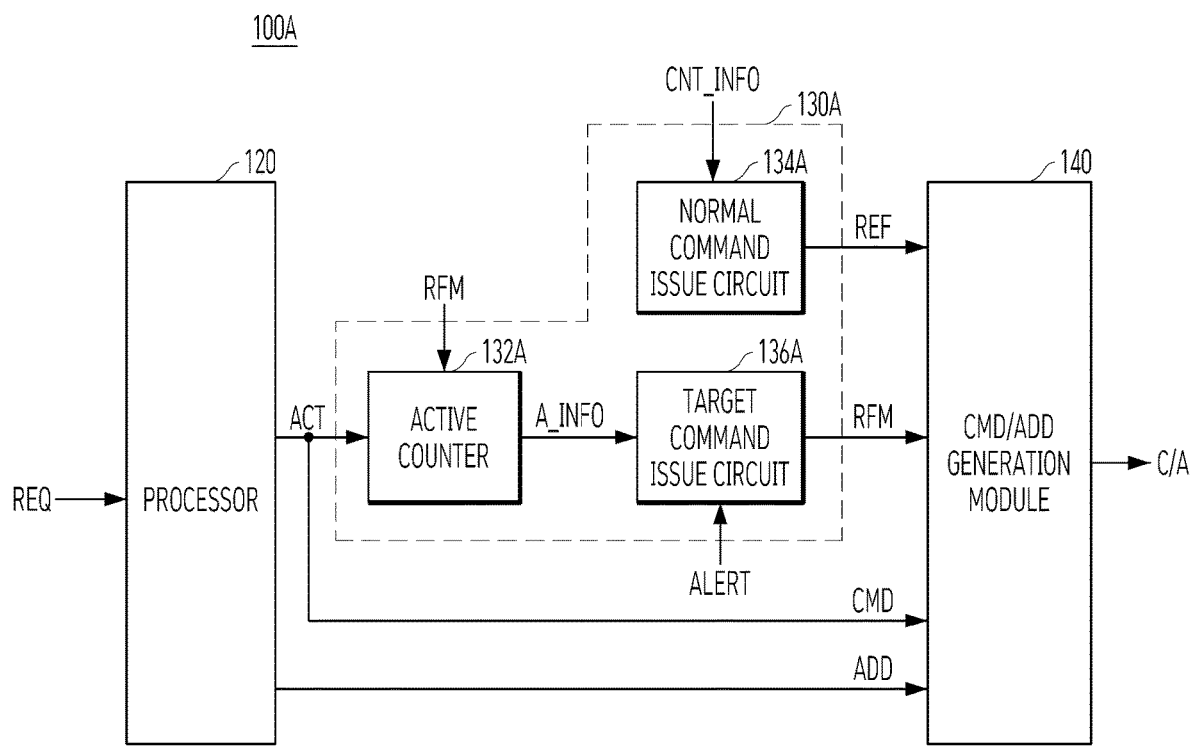
FIGS. 2A and 2B are a detailed configuration diagram and an operation timing diagram illustrating a memory controller shown in FIG. 1 in accordance with an embodiment of the present invention.

Various embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout this disclosure, like reference numerals refer to like parts throughout the various figures and embodiments of the present invention.

It will be understood that when an element is referred to as being "coupled" or "connected" to another element, it may mean that the two are directly coupled or the two are electrically connected to each other with another circuit intervening therebetween. It will be further understood that the terms "comprise", "include", "have", etc. when used in this specification, specify the presence of stated features, numbers, steps, operations, elements, components, and/or combinations of them but do not preclude the presence or addition of one or more other features, numbers, steps, operations, elements, components, and/or combinations thereof. In the present disclosure, the singular forms are intended to include the plural forms as well, unless the context clearly indicates otherwise.

Typically, a volatile memory device such as a DRAM needs a refresh operation to secure a data retention time. The refresh operation may include a normal refresh operation in which the memory device sequentially refreshes a plurality of word lines (hereinafter referred to as "a plurality of rows"), and a target refresh operation by which one or more adjacent rows (or victim rows) adjacent to a target row (or an aggressor row) are refreshed. The aggressor row is the row that is activated a great number of times or activated too frequently.

For the normal refresh operation, the memory controller may periodically provide the memory device with a preset number of normal refresh commands (or auto-refresh commands, REF) within a time (i.e., a refresh window tREFW) when all memory cells need to be refreshed. For example, the memory controller may provide 8K (8192) normal refresh commands REF to the memory device within a refresh window tREFW of 32 ms. For the target refresh operation, the memory controller may detect a situation in which a row-hammer phenomenon may occur. For example, when the number of active commands input reaches a target number and it is determined that it is difficult to secure the data retention time with the normal refresh operation, the memory controller may provide a refresh management command RFM to the memory device non-periodically.

Since the memory controller preemptively provides the refresh management commands RFM to mitigate the row-hammer phenomenon, somewhat excessive target refresh operations may be required from the perspective of the memory device. As a result, the power consumption due to unnecessary target refresh operations increases, and the efficiency of the command/address bus decreases. Hereinafter, in embodiments of the present invention, a method of minimizing the power consumption while maintaining the row-hammer attack defense capability will be described.

FIG. 1 is a block diagram illustrating a memory system 10 in accordance with an embodiment of the present invention.

Referring to FIG. 1, the memory system 10 may include a memory controller 100, and a memory device 200.

The memory controller 100 may control the general operation of the memory system 10 and it may control general data exchange between a host 20 and the memory device 200. The memory controller 100 may generate a command/address signal C/A according to a request REQ from the host 20 and may provide the generated command/address signal C/A to the memory device 200. The memory controller 100 may provide a clock together with the command/address signal C/A to the memory device 200. The memory controller 100 may provide data DQ corresponding to the request REQ from the host 20 to the memory device 200, and provide the data DQ read from the memory device 200 to the host 20.

The host 20 may include a central processing unit (CPU), a graphic processing unit (GPU), an application processor (AP), and the like. The memory controller 100 may be included in a CPU, a GPU, an AP, or the like, and in this case, the host 20 may mean a configuration other than the memory controller 100 in these configurations. For example, when the memory controller 100 is included in the CPU, the host 20 may represent the remaining components in the CPU except the memory controller 100.

In detail, the memory controller 100 may include a host interface 110, a processor 120, a refresh management module 130, a command/address (CMD/ADD) generation module 140, a memory interface 150, and a bus 160.

The host interface 110 may be configured to communicate with the host 20 connected to the memory system 10 under the control of the processor 120. For example, the host interface 110 may provide the data DQ corresponding to the request REQ from the host 20, to the memory device 200, and receive the data DQ read from the memory device 200, through the memory interface 150.

The processor 120 may perform various types of computational and/or other operations for controlling the memory device 200, and/or may execute instructions in the form of firmware or other types of software. The processor 120 may receive the request REQ provided from the host 20 through the host interface 110. The processor 120 may generate an address and various commands corresponding to the request REQ, such as an active command ACT, a precharge command, a read command, a write command, a mode register command, and provide the address and commands to the refresh management module 130 and the command/address generation module 140. The processor 120 may change the order in which the request REQ is received from the host 20 and the order of the operation to be instructed to the memory device 200 to improve the performance of the semiconductor memory device 200. For example, the processor 120 may adjust the order so that a write operation is performed before a read operation, even if the host 20 requests the read operation of the semiconductor memory device 200 first and the write operation later. The processor 120 may control overall operations of the host interface 110, the refresh management module 130, the command/address generation module 140, and the memory interface 150.

The refresh management module 130 may generate refresh-related commands, based on the address and commands (i.e., the active command ACT) provided from the processor 120. The refresh-related commands may include a normal refresh command REF, a refresh management command RFM, and the like. The refresh management module 130 may periodically generate a preset number of the normal refresh commands REF during a refresh window tREFW defined in a specification. The refresh management module 130 may non-periodically generate the refresh management command RFM based on the active command ACT. For example, the refresh management module 130 may generate the refresh management command RFM whenever the number of inputs of the active command ACT reaches a target number. The target number may be preset according to a situation in which the row-hammer phenomenon may occur in consideration of the performance of the memory device 200.

In an embodiment of the present invention, the refresh management module 130 may adjust a frequency of issuance (hereinafter, referred to as "an issuance frequency") of at least one of the normal refresh command REF and the refresh management command RFM based on a replacement counting value CNT_INFO provided by the memory device 200. For example, the refresh management module 130 may reduce the issuance frequency of the normal refresh command REF in proportion to the replacement counting value CNT_INFO or reduce the issuance frequency of the refresh management command RFM by increasing the target number according to the replacement counting value CNT_INFO. In addition, the refresh management module 130 may adjust the issuance frequency of the refresh management command RFM based on an alert signal ALERT provided by the memory device 200. For example, when the alert signal ALERT is activated, the refresh management module 130 may reduce the issuance frequency of the refresh management command RFM by omitting the issuance of the refresh management command RFM a certain number of times. According to an embodiment, the replacement counting value CNT_INFO may be provided in the form of data DQ from the memory device 200, and the alert signal ALERT may be provided from the memory device 200 through a separate signal line. The detailed configuration and operation of the refresh management module 130 will be described with reference to the embodiments of FIGS. 2A to 5B.

The command/address generation module 140 may generate the command/address signal C/A by using the address and commands provided from the processor 120 and the refresh-related command provided from the refresh management module 130. The command/address generation module 140 may provide an address to be activated together with the active command ACT, as the command/address signal C/A, and provide the normal refresh command REF or the refresh management command RFM as the command/address signal C/A.

The memory interface 150 may be configured to communicate with the memory device 200 under the control of the processor 120. For example, the memory interface 150 may transmit the command/address signal C/A and the data DQ to the memory device 200 and may transmit the data DQ read from the memory device 200 to the host interface 110.

The processor 120 may transmit data between the host interface 110, the refresh management module 130, the command/address generation module 140, and the memory interface 150 via the bus 160. According to an embodiment, the host interface 110, the refresh management module 130, the command/address generation module 140, and the memory interface 150 may communicate with each other independently without passing through the bus 160. For example, the refresh management module 130 and host interface 110 may communicate directly with each other without passing through the bus 160. The refresh management module 130 and the memory interface 150 may communicate with each other directly without passing through the bus 160. The host interface 110 and the memory interface 150 may also communicate directly with each other without passing through the bus 160.

The memory device 200 may perform an active operation, a refresh operation, a write operation, and a read operation according to the command/address signal C/A and/or the data DQ that are provided from the memory controller 100. The memory device 200 may be a memory that requires a refresh operation. For example, the memory device 200 may be a DRAM, and may be another type of memory for which a refresh operation is required. The refresh operation may include a normal refresh operation in which the memory device 200 sequentially refreshes a plurality of rows, and a target refresh operation by which one or more victim rows disposed adjacent to an aggressor row are refreshed.

The memory device 200 may generate an active command ACT, a normal refresh command REF, and a refresh management command RFM, which are related to a row control operation by decoding the command/address signal C/A. The memory device 200 may additionally generate commands (e.g., a read command or a write command) related to data input/output operations by decoding the command/address signal C/A. The memory device 200 may additionally generate commands (e.g., a mode register command) related to a mode setting operation by decoding the command/address signal C/A. The memory device 200 may perform a normal refresh operation according to the normal refresh command REF and a target refresh operation according to the refresh management command RFM.

In an embodiment of the present invention, the memory device 200 may replace the target refresh operation corresponding to the refresh management command RFM with the normal refresh operation corresponding to the normal refresh command REF, according to a memory information signal. The memory device 200 may count a number of times of the replacing to generate the replacement counting value CNT_INFO. In this case, the memory information signal may include at least one of temperature information of the memory device 200, product code information of the memory device 200, the number of activations (or accesses) per memory regions of the memory device 200 (i.e., the number of times that each memory region is activated or accessed), and the number of activations of an aggressor row for the target refresh operation (i.e., the number of times that an aggressor row is activated). The memory device 200 may store the replacement counting value CNT_INFO in a storage circuit (e.g., a mode register) and provide the stored replacement counting value CNT_INFO to the memory controller 100 in the form of data DQ according to a readout command (e.g., a mode register command).

Further, the memory device 200 may set a threshold value in advance and generate the alert signal ALERT when the replacement counting value CNT_INFO reaches the threshold value. That is, before the readout command is provided from the memory controller 100, when the replacement counting value CNT_INFO reaches the threshold value, the memory device 200 may provide the alert signal ALERT to the memory controller 100 indicating that the refresh management command RFM is being excessively provided. The memory device 200 may provide the alert signal ALERT to the memory controller 100 through a separate signal line. A detailed configuration and operation of the memory device 200 will be described with reference to embodiments of FIGS. 6 to 14.

As described above, in accordance with the embodiment of the present invention, the memory device 200 may determine that the target refresh operation according to the refresh management command RFM provided by the memory controller 100 is unnecessary. In this case, the memory device 200 may replace the target refresh operation with the normal refresh operation, accumulate and manage the number of times of the replacing to provide it to the memory controller 100. The memory controller 100 may reduce the number of times, which the normal refresh command REF or the refresh management command RFM is issued, based on the number of times of the replacing. Therefore, the power consumption due to unnecessary refresh operations may be prevented and the efficiency of the command/address bus may be maximized. Accordingly, the refresh operation may be performed flexibly, thereby increasing the refresh efficiency and maximizing the row-hammer attack defense capability.

Hereinafter, a detailed configuration of the memory controller 100 according to embodiments of the present invention will be described with reference to the drawings.

Figure 2B:
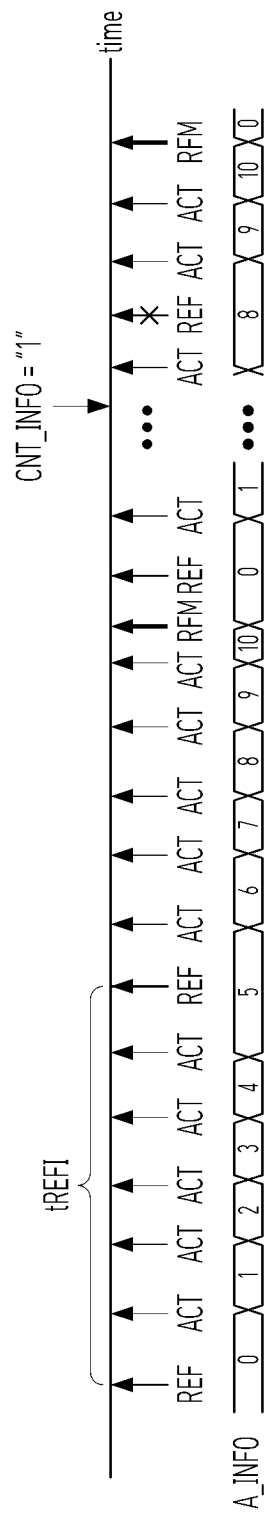

FIGS. 2A and 2B are a detailed configuration diagram and an operation timing diagram illustrating a memory controller 100A shown in FIG. 1 in accordance with an embodiment of the present invention.

Referring to FIG. 2A, a detailed configuration of a refresh management module 130A of the memory controller 100A is shown. The refresh management module 130A may include an active counter 132A, a normal command issue circuit 134A and a target command issue circuit 136A.

The active counter 132A may count the number of inputs of the active command ACT provided by the processor 120 to generate an active counting value A_INFO. The active counter 132A may initialize the active counting value A_INFO whenever the refresh management command RFM is issued.

The normal command issue circuit 134A may issue the normal refresh command REF at each refresh interval tREFI during the refresh window tREFW, while adjusting the issuance frequency of the normal refresh command REF according to the replacement counting value CNT_INFO. For example, the normal command issue circuit 134A may reduce the issuance frequency of the normal refresh command REF in proportion to the replacement counting value CNT_INFO.

The target command issue circuit 136A may issue the refresh management command RFM whenever the active counting value A_INFO reaches the target number. Depending on an embodiment, the target command issue circuit 136A may adjust the issuance frequency of the refresh management command RFM based on the alert signal ALERT. For example, the target command issue circuit 136A may reduce the issuance frequency of the refresh management command RFM by omitting the issuance of the refresh management command RFM a certain number of times, when the alert signal ALERT is activated.

The C/A generation module 140 may generate the command/address signal C/A based on the command CMD and the address ADD provided by the processor 120 and the normal refresh command REF and the refresh management command RFM provided by the refresh management module 130A and may provide the command/address signal C/A to the memory device 200.

Referring to FIG. 2B, an operation of the refresh management module 130A is illustrated as an example.

The active counter 132A may generate the active counting value A_INFO, which increases by "+1" each time the active command ACT is input. The normal command issue circuit 134A may issue the normal refresh command REF at each refresh interval tREFI. The target command issue circuit 136A may issue the refresh management command RFM whenever the active counting value A_INFO reaches the target number (e.g., 10). As the refresh management command RFM is issued, the active counter 132A may initialize the active counting value A_INFO to "0".

When the replacement counting value CNT_INFO of "1" is provided from the memory device 200, the normal command issue circuit 134A may once skip the issuance of the normal refresh command REF in proportion to the replacement counting value CNT_INFO of "1". Accordingly, the issue frequency of the normal refresh command REF may be reduced.

Figure 3:
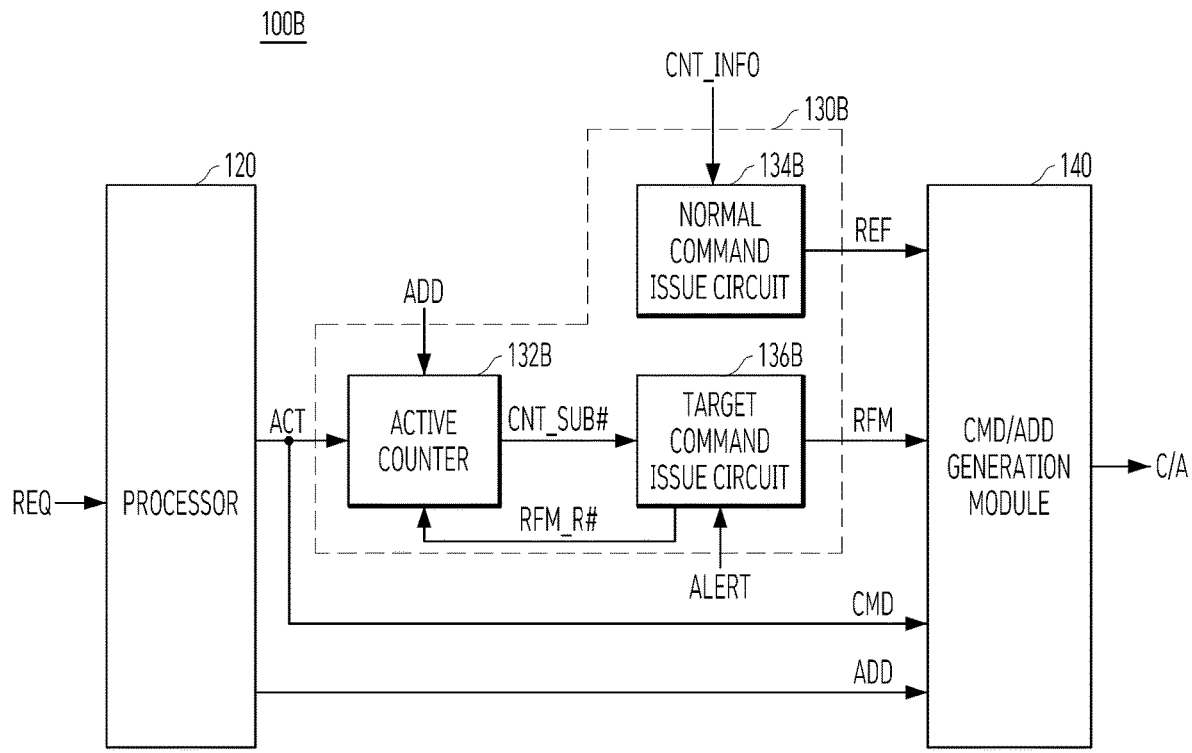
FIG. 3 is a detailed configuration diagram illustrating a memory controller in accordance with a modified embodiment of the present invention.
Figure 4:
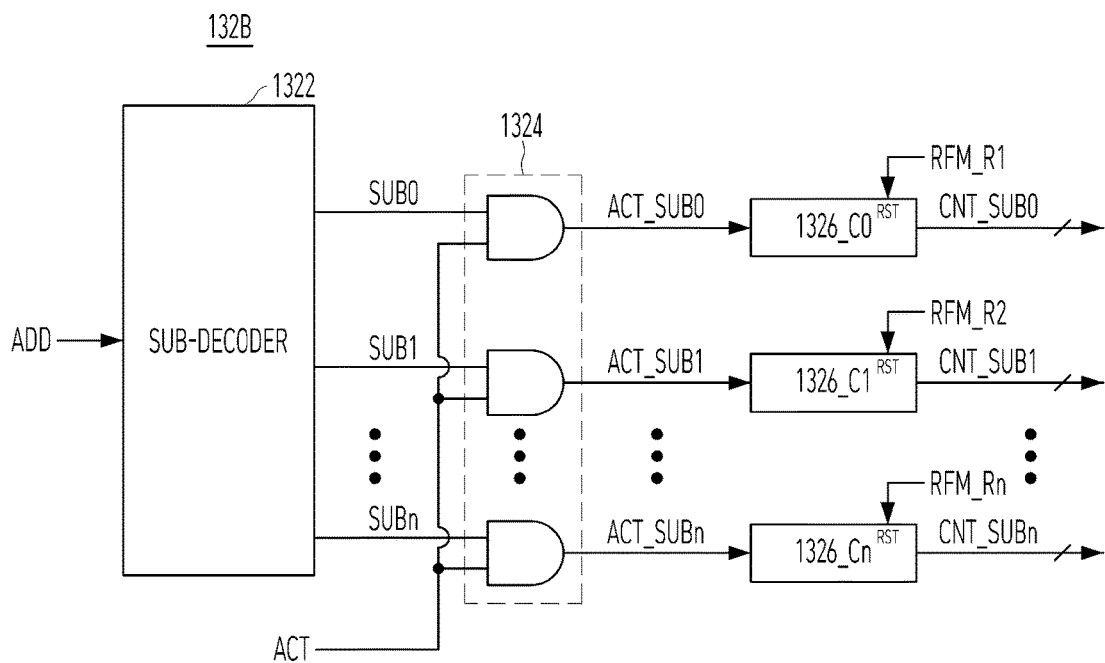
FIG. 4 is a circuit diagram illustrating an active counter of FIG. 3.

FIG. 3 is a detailed configuration diagram illustrating a memory controller 100B in accordance with a modified embodiment of the present invention. FIG. 4 is a circuit diagram illustrating an active counter 132B of FIG. 3.

Referring to FIG. 3, the refresh management module 130B may include the active counter 132B, a normal command issue circuit 134B and a target command issue circuit 136B.

The active counter 132B may generate, based on the active command ACT and the address ADD provided by the processor 120, a plurality of active counting values CNT_SUB0 to CNT_SUBn for respective memory regions of the memory device 200. For example, when the address ADD includes a row address, the memory regions may be regions divided into a predetermined number of rows. When the address ADD includes a bank address, the memory regions may be regions divided into banks. The active counter 132B may selectively initialize the active counting values CNT_SUB # according to reset signals RFM_R # that are provided from the target command issue circuit 136B, # being an integer between 0 and 'n'.

Referring to FIG. 4, the active counter 132B may include a sub-decoder 1322, an active combiner 1324 and a plurality of sub-counters 1326_C0 to 1326_Cn.

The sub-decoder 1322 may decode the address ADD to generate a plurality of sub-region signals SUB0 to SUBn for designating the respective memory regions. Preferably, the sub-decoder 1322 may generate a plurality of sub-region signals SUB0 to SUBn by decoding only some of the bits of the address ADD that specify rows or banks. For example, the sub-decoder 1322 may activate the first sub-region signal SUB0 when the address ADD designating a row belonging to a first memory region among the memory regions is input.

The active combiner 1324 may respectively output the plurality of sub-region signals SUB0 to SUBn as a plurality of sub-region activation signals ACT_SUB0 to ACT_SUBn whenever the active command ACT is input. The active combiner 1324 may be implemented with a plurality of AND gates for performing a logic AND operation on the active command ACT and the sub-region signals SUB0 to SUBn, respectively.

The sub-counters 1326_C0 to 1326_Cn may correspond to the respective memory regions and may generate the respective active counting values CNT_SUB0 to CNT_SUBn. Each of the sub-counters 1326_C0 to 1326_Cn may increase a corresponding active counting value of the active counting values CNT_SUB0 to CNT_SUBn by "+1" each time a corresponding sub-region activation signal of the sub-region activation signals ACT_SUB0 to ACT_SUBn is activated. Each of the sub-counters 1326_C0 to 1326_Cn may be initialized when a corresponding reset signal among the reset signals RFM_R0 to RFM_Rn is activated.

With the above configuration, the active counter 132B may generate, based on the address ADD and the active command ACT, the active counting values CNT_SUB0 to CNT_SUBn for respective memory regions of the memory device 200.

Referring back to FIG. 3, the normal command issue circuit 134B may issue the normal refresh command REF at each refresh interval tREFI during the refresh window tREFW, while adjusting the issuance frequency of the normal refresh command REF according to the replacement counting value CNT_INFO.

The target command issue circuit 136B may issue the refresh management command RFM whenever at least one of the active counting values CNT_SUB0 to CNT_SUBn reaches the target number. After the refresh management command RFM is issued, the target command issue circuit 136B may activate a reset signal corresponding to an active counting value that reaches the target number among the reset signals RFM_R0 to RFM_Rn. Depending on an embodiment, the target command issue circuit 136B may adjust the issuance frequency of the refresh management command RFM based on the alert signal ALERT. For example, the target command issue circuit 136B may reduce the issuance frequency of the refresh management command RFM by omitting the issuance of the refresh management command RFM a certain number of times, when the alert signal ALERT is activated.

The C/A generation module 140 may generate the command/address signal C/A based on the command CMD and the address ADD provided by the processor 120 and the normal refresh command REF and the refresh management command RFM provided by the refresh management module 130A and may provide the command/address signal C/A to the memory device 200.

As described above, the refresh management module 130B according to the modified embodiment may generate the refresh management command RFM according to active counting values CNT_SUB0 to CNT_SUBn which are generated by respectively counting the active command ACT provided for each memory region of the memory device 200.

Figure 5A:
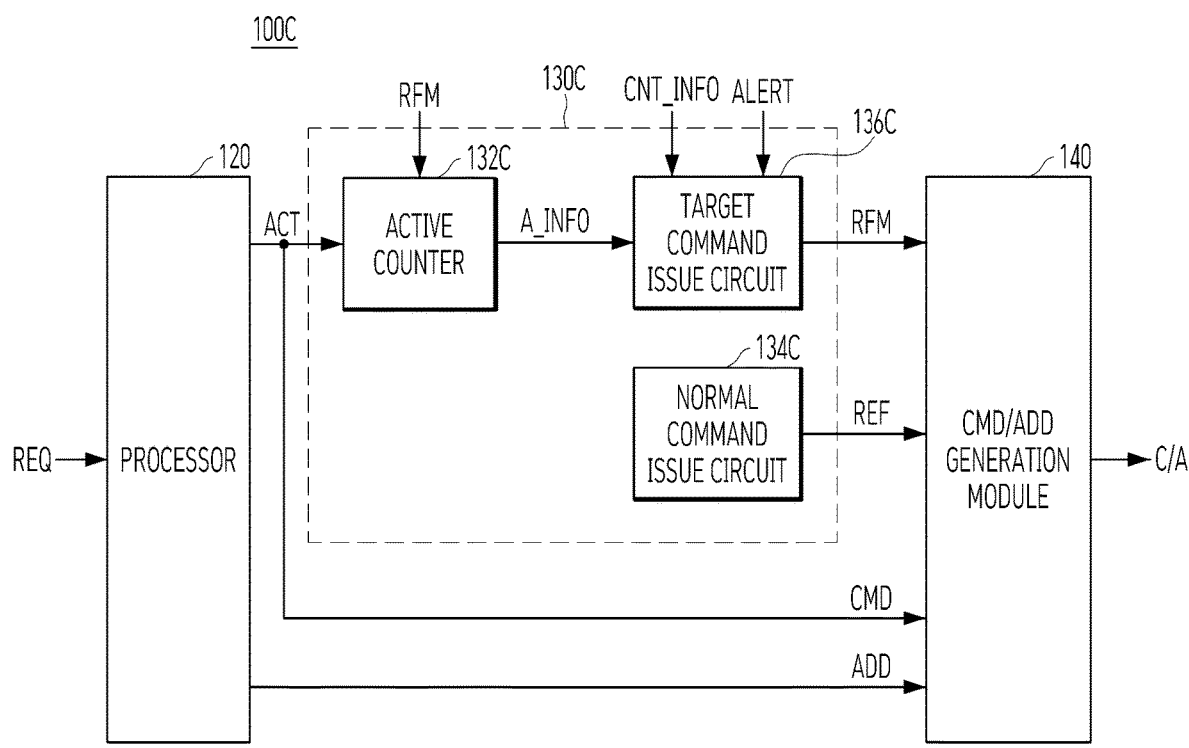
FIGS. 5A and 5B are a detailed configuration diagram and an operation timing diagram illustrating a memory controller shown in FIG. 1 in accordance with another embodiment of the present invention.
Figure 5B:
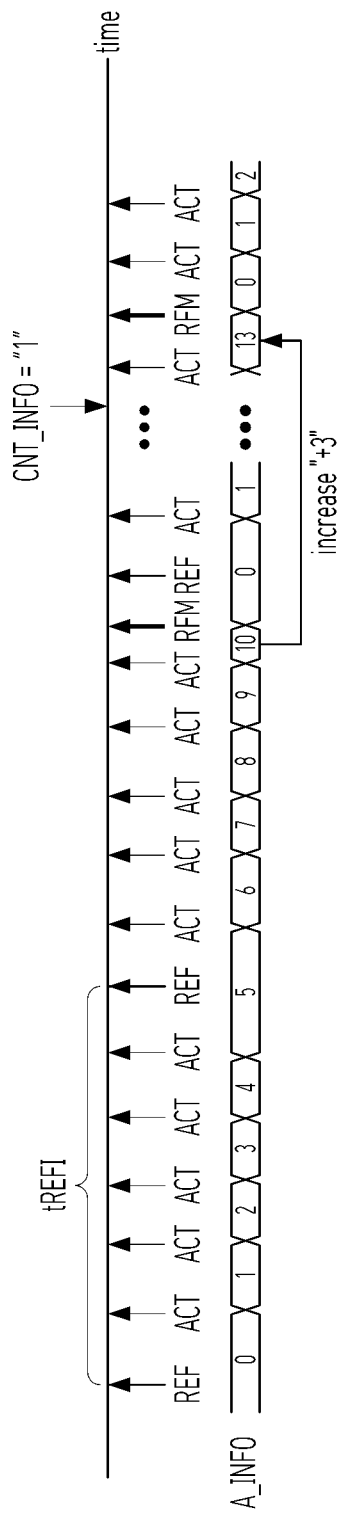

FIGS. 5A and 5B are a detailed configuration diagram and an operation timing diagram illustrating a memory controller 100C shown in FIG. 1 in accordance with another embodiment of the present invention.

Referring to FIG. 5A, the refresh management module 130C may include an active counter 132C, a normal command issue circuit 134C and a target command issue circuit 136C.

The active counter 132C may count the number of inputs of the active command ACT to generate an active counting value A_INFO. The active counter 132C may initialize the active counting value A_INFO whenever the refresh management command RFM is issued.

The normal command issue circuit 134C may issue the normal refresh command REF at each refresh interval tREFI during the refresh window tREFW.

The target command issue circuit 136C may issue the refresh management command RFM whenever the active counting value A_INFO reaches the target number, while adjusting the issuance frequency of the refresh management command RFM according to the replacement counting value CNT_INFO. For example, the target command issue circuit 136C may reduce the issuance frequency of the refresh management command RFM by increasing the target number according to the replacement counting value CNT_INFO. Depending on an embodiment, the target command issue circuit 136C may further adjust the issuance frequency of the refresh management command RFM based on the alert signal ALERT. For example, the target command issue circuit 136C may reduce the issuance frequency of the refresh management command RFM by omitting the issuance of the refresh management command RFM a certain number of times, when the alert signal ALERT is activated.

Although not illustrated in FIG. 5A, the normal command issue circuit 134C may receive the alert signal ALERT, depending on an embodiment. The normal command issue circuit 134C may issue the normal refresh command REF at each refresh interval tREFI during the refresh window tREFW, while adjusting the issue frequency of the normal refresh command REF when the alert signal ALERT is activated.

The C/A generation module 140 may generate the command/address signal C/A based on the command CMD and the address ADD provided by the processor 120 and the normal refresh command REF and the refresh management command RFM provided by the refresh management module 130C and may provide the command/address signal C/A to the memory device 200.

Referring to FIG. 5B, an operation of the refresh management module 130C is illustrated as an example.

The active counter 132C may generate the active counting value A_INFO, which increases by "+1" each time the active command ACT is input. The normal command issue circuit 134C may issue the normal refresh command REF at each refresh interval tREFI. The target command issue circuit 136C may issue the refresh management command RFM whenever the active counting value A_INFO reaches the target number (e.g., 10). As the refresh management command RFM is issued, the active counter 132C may initialize the active counting value A_INFO to "0".

When the replacement counting value CNT_INFO of "1" is provided from the memory device 200, the target command issue circuit 136C may increase the target number by a certain value (e.g., "+3") according to the replacement counting value CNT_INFO of "1". Accordingly, the issue frequency of the refresh management command RFM may be reduced.

Hereinafter, a detailed configuration of the memory device 200 according to embodiments of the present invention will be described with reference to the drawings.

Figure 6:
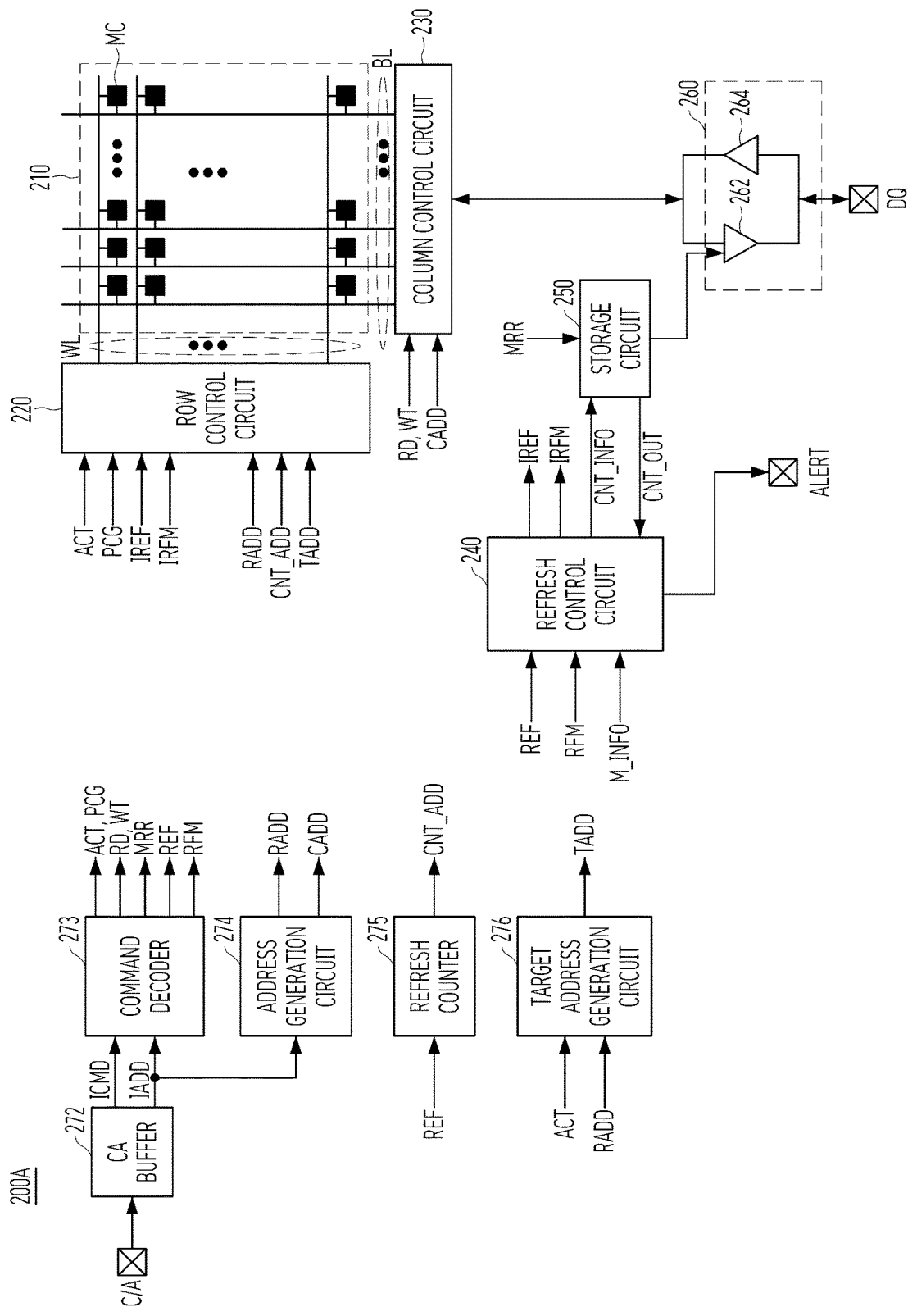
FIG. 6 is a detailed block diagram illustrating a memory device in accordance with a first embodiment of the present invention.

FIG. 6 is a detailed block diagram illustrating a memory device 200A in accordance with a first embodiment of the present invention.

Referring to FIG. 6, the memory device 200A may include a memory cell region 210, a row control circuit 220, a column control circuit 230, a refresh control circuit 240, a storage circuit 250, a data input/output circuit 260, a command/address (CA) buffer 272, a command decoder 273, an address generation circuit 274, a refresh counter 275, and a target address generation circuit 276.

The memory cell region 210 may include a plurality of memory cells MC respectively coupled to a plurality of rows WL and a plurality of columns BL. The plurality of rows WL may extend in a first direction (e.g., a row direction) and may be sequentially disposed in a second direction (e.g., a column direction). The plurality of columns BL may extend in the column direction and may be sequentially disposed in the row direction. The plurality of memory cells MC may be composed of memory cells that require a refresh operation to secure data retention time. The memory cell region 210 may be composed of at least one bank. The number of banks or the number of memory cells MC may be determined depending on the capacity of the memory device 200.

The CA buffer 272 may receive a command/address signal C/A from an external device (e.g., the memory controller) through a command/address pad. The CA buffer 272 may buffer the command/address signal C/A to output an internal command ICMD and an internal address IADD.

The command decoder 273 may decode the internal command ICMD output from the CA buffer 272 to generate an active command ACT, a precharge command PCG, a read command RD, a write command WT, and a mode register command MRR. Further, the command decoder 273 may decode the internal command ICMD to generate a normal refresh command REF as a periodic refresh command, and a refresh management command RFM as a non-periodic refresh command.

The address generation circuit 274 may classify the internal address IADD received from the CA buffer 272 as a row address RADD and a column address CADD. Depending on an embodiment, the address generation circuit 274 may classify some bits of the internal address IADD as a row address RADD and classify the remaining bits as a column address CADD. The address generation circuit 274 may classify the internal address IADD as a row address RADD when an active operation is directed as a result of the decoding by the command decoder 273 and may classify the internal address IADD as a column address CADD when a read or write operation is directed. The plurality of rows WL may be accessed by the row address RADD, and the plurality of columns BL may be accessed by the column address CADD.

The refresh counter 275 may generate a counting address CNT_ADD whose value increases sequentially every time the normal refresh command REF is input. The rows WL may be sequentially refreshed during a normal refresh operation according to the counting address CNT_ADD.

The target address generation circuit 276 may collect sampling addresses for a row vulnerable to a row-hammer attack to output one of the sampling addresses as a target address TADD. For example, the target address generation circuit 276 may store the row address RADD input with the active command ACT as one of the sampling addresses, and select and output one of the sampling addresses as the target address TADD at a random time. According to an embodiment, the target address generation circuit 276 may calculate adjacent addresses of the selected address and output the calculated adjacent addresses as the target address TADD.

In an embodiment of the present invention, the row control circuit 220 and the refresh control circuit 240 may be defined as a control circuit. The control circuit 220 and 240 may perform a normal refresh operation on the memory cell region 210 according to the normal refresh command REF, and a target refresh operation on the memory cell region 210 according to the refresh management command RFM. The control circuit 220 and 240 may replace the target refresh operation with the normal refresh operation. The control circuit 220 and 240 may count the number of times of the replacing to generate the replacement counting value CNT_INFO.

In detail, the refresh control circuit 240 may activate a first internal command signal IREF according to the normal refresh command REF and activate a second internal command signal IRFM according to the refresh management command RFM, while activating the first internal command signal IREF according to the refresh management command RFM based on a memory information signal M_INFO and increasing the replacement counting value CNT_INFO. The refresh control circuit 240 may initialize the replacement counting value CNT_INFO according to a counting output signal CNT_OUT provided from the storage circuit 250. Depending on an embodiment, the refresh control circuit 240 may set a threshold value in advance and generate an alert signal ALERT when the replacement counting value CNT_INFO reaches the threshold value. The refresh control circuit 240 may provide the alert signal ALERT to the memory controller through a separate pad.

In the first embodiment of the present invention, the memory information signal M_INFO may include at least one of temperature information and product code information of the memory device 200A. For example, the memory device 200A may store the temperature information on a current temperature provided by an internal temperature sensor or an external temperature sensor, in a mode setting circuit (MRS). In addition, the memory device 200A may store the product code information on an environment in which the memory device 200A will be used, in the mode setting circuit (MRS). For example, the product code information may include information on whether the memory device 200A is for a server that requires more row-hammer response or a mobile that requires relatively less row-hammer response. The refresh control circuit 240 may receive, as the memory information signal M_INFO, at least one of the temperature information and the product code information stored in the mode setting circuit (MRS) during boot-up.

The row control circuit 220 may be coupled to the memory cells MC in the memory cell region 110 through the plurality of rows WL. The row control circuit 220 may select or activate at least one row selected by the row address RADD when the active command ACT is input and may deactivate the activated row when the precharge command PCG is input. The row control circuit 220 may perform the normal refresh operation on a row corresponding to the counting address CNT_ADD in response to the first internal command signal IREF. The row control circuit 120 may perform the target refresh operation on one or more victim rows selected by the target address TADD in response to the second internal command signal IRFM.

The memory device 200A may further include a target command generation circuit (not shown) for internally generating a target refresh command (TREF) whenever the number of inputs of the normal refresh command REF reaches a preset number or reaches a preset condition. That is, the refresh management command RFM may be a command provided from the memory controller for a target refresh operation, and the target refresh command TREF may be a command generated by the memory device 200A itself for a target refresh operation. The row control circuit 220 may perform a target refresh operation on the victim rows selected by the target address TADD in response to the refresh management command RFM or the target refresh command TREF.

The column control circuit 230 may select some columns among the columns BL, according to the column address CADD, read out data from the memory cell region 210 through the selected columns in response to the read command RD, and write data provided from the memory controller into the memory cell region 210 through the selected columns in response to the write command WT.

The data input/output circuit 260 may be coupled between the column control circuit 230 and a data pad to transmit and receive data DQ to and from the memory controller. The data input/output circuit 260 may include a data output circuit 262 and a data input circuit 264. The data output circuit 262 may output the data DQ read from the memory cell region 210 through the data pad. The data input circuit 264 may receive the data DQ provided from the memory controller through the data pad.

The storage circuit 250 may store the replacement counting value CNT_INFO generated by the refresh control circuit 240 and may output the stored replacement counting value CNT_INFO according to a readout command. The storage circuit 250 may provide the stored replacement counting value CNT_INFO to the data output circuit 262 in response to the readout command, and the data output circuit 262 may output the replacement counting value CNT_INFO to the memory controller through the data pad. The storage circuit 250 may activate the counting output signal CNT_OUT after the replacement counting value CNT_INFO is output. Depending on an embodiment, the storage circuit 250 may be implemented with a known mode setting circuit (MRS), to provide stored signals to the data output circuit 262 in response to the mode register command MRR.

Figure 7A:
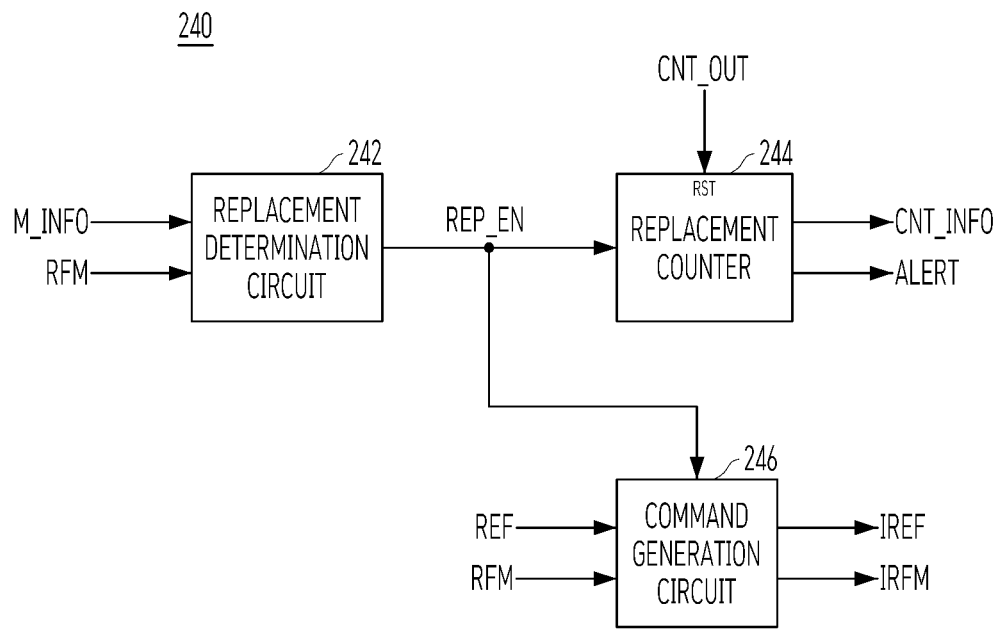
FIGS. 7A and 7B are a detailed configuration diagram and an operation timing diagram illustrating a refresh control circuit of FIG. 6.
Figure 7B:
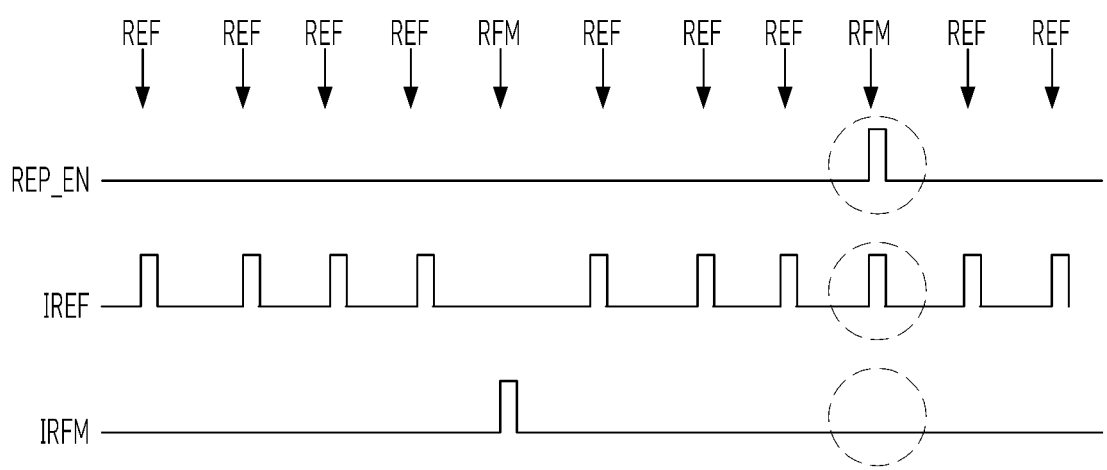

FIGS. 7A and 7B are a detailed configuration diagram and an operation timing diagram illustrating the refresh control circuit 240 of FIG. 6.

Referring to FIG. 7A, the refresh control circuit 240 may include a replacement determination circuit 242, a replacement counter 244, and a command generation circuit 246.

The replacement determination circuit 242 may determine whether to activate a replacement enable signal REP_EN based on the memory information signal M_INFO, when the refresh management command RFM is input, where the memory information signal M_INFO includes at least one of the temperature information and the product code information of the memory device 200A. For example, the replacement determination circuit 242 may determine that a row-hammer response is less required when the current temperature is higher than a certain temperature based on the temperature information, and activate the replacement enable signal REP_EN according to the refresh management command RFM. For example, the replacement determination circuit 242 may determine that the memory device 200A is for mobile, which requires less row-hammer response based on the product code information, and activate the replacement enable signal REP_EN according to the refresh management command RFM.

The replacement counter 244 may count the number of times, which the replacement enable signal REP_EN is activated, to generate the replacement counting value CNT_INFO. The replacement counter 244 may increase the replacement counting value CNT_INFO by "+1" each time the replacement enable signal REP_EN is activated. The replacement counter 244 may initialize the replacement counting value CNT_INFO according to the counting output signal CNT_OUT provided from the storage circuit 250. On the other hand, the replacement counter 244 may set the threshold value in advance and may generate the alert signal ALERT when the replacement counting value CNT_INFO reaches the threshold value. In this case, the threshold value may be set according to the number of pulled-in refresh operations or the number of postponed refresh operations, set for each memory device. The pulled-in refresh operations may be an operation that allows a certain number (e.g., 8) of refresh operations to be performed continuously for each memory device, to thereby improve a situation where subsequent operations are constrained by a refresh interval. The postponed refresh operations may be an operation that allows a certain number of refresh operations to be delayed and performed continuously. In an embodiment of the present invention, the replacement counter 244 may set the threshold value to the number of pulled-in refresh operations, or the number of postponed refresh operations preset for each memory device.

The command generation circuit 246 may activate the first internal command signal IREF according to the normal refresh command REF and activate the second internal command signal IRFM according to the refresh management command RFM. The command generation circuit 246 may activate, according to the replacement enable signal REP_EN, the first internal command signal IREF while preventing the second internal command signal IRFM from being activated. As illustrated in FIG. 7B, the command generation circuit 246 may prevent, when the replacement enable signal REP_EN is activated, activation of the second internal command signal IRFM while activating the first internal command signal IREF.

As described above, the memory device 200A according to the first embodiment of the present invention may replace the target refresh operation with the normal refresh operation based on the memory information signal M_INFO including at least one of the temperature information and the product code information of the memory device 200A. The memory device 200A may count the number of times of the replacing, store it as the replacement counting value CNT_INFO, and output the replacement counting value CNT_INFO to the memory controller in response to the readout command MRR. In addition, when the replacement counting value CNT_INFO reaches the threshold value, the memory device 200A may generate the alert signal ALERT and output it to the memory controller.

Figure 8:
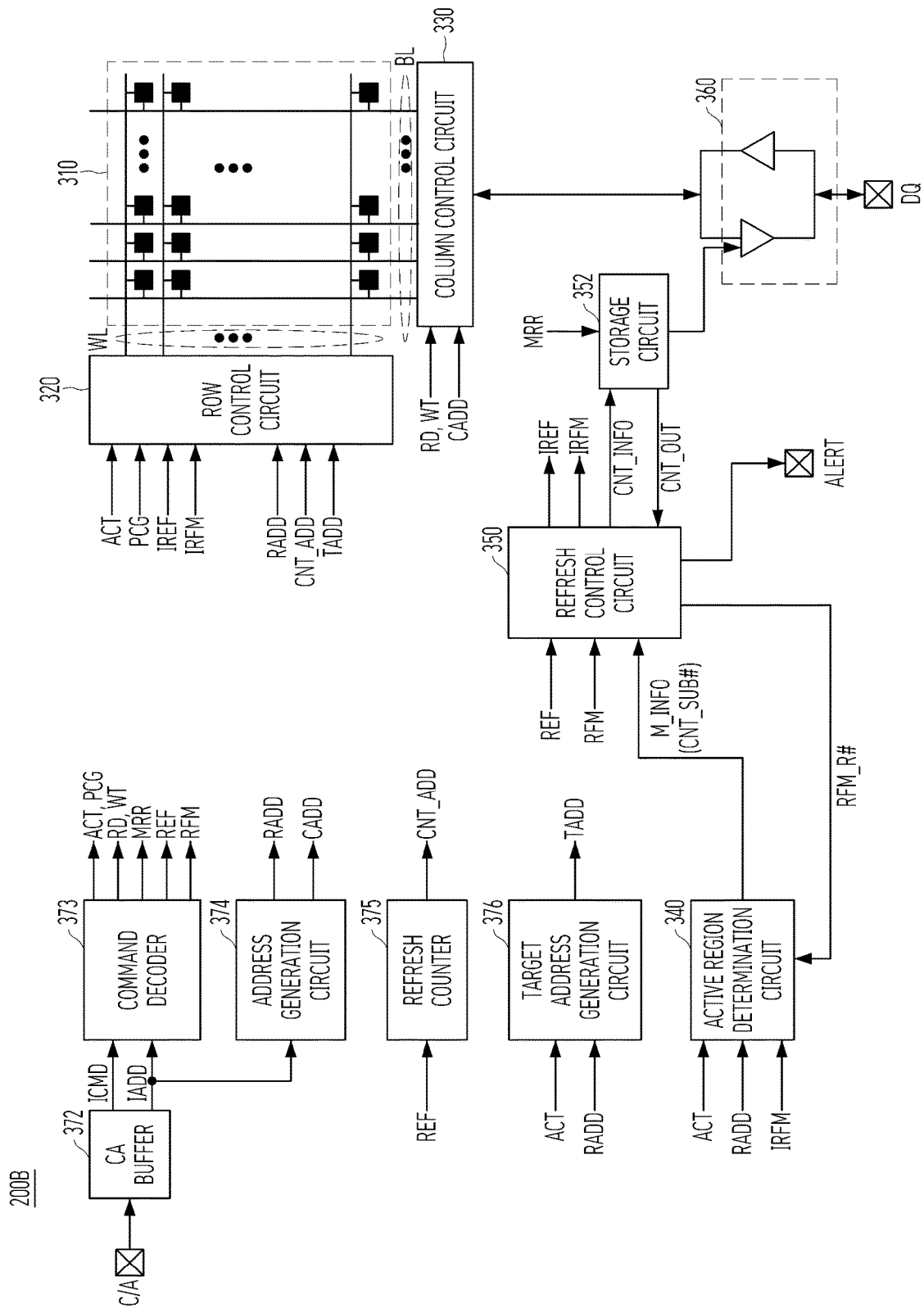
FIG. 8 is a detailed block diagram illustrating a memory device in accordance with a second embodiment of the present invention.
Figure 9:
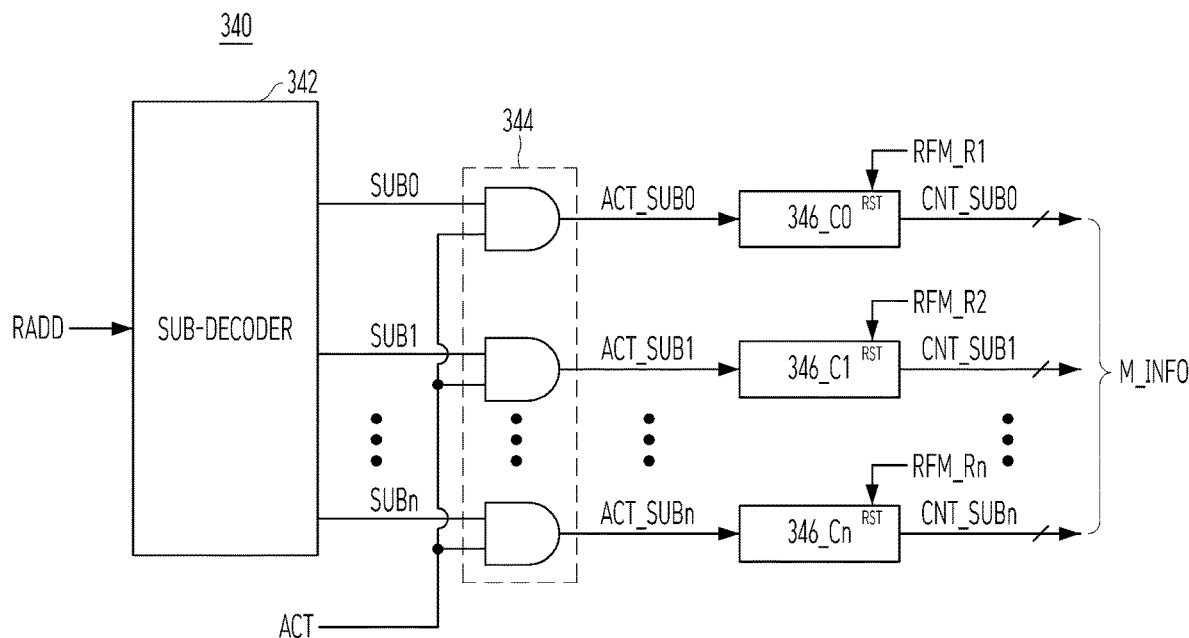
FIG. 9 is a circuit diagram illustrating an active region determination circuit shown in FIG. 8.

FIG. 8 is a detailed block diagram illustrating a memory device 200B in accordance with a second embodiment of the present invention. FIG. 9 is a circuit diagram illustrating an active region determination circuit 340 shown in FIG. 8.

Referring to FIG. 8, the memory device 200B may include a memory cell region 310, a row control circuit 320, a column control circuit 330, the active region determination circuit 340, a refresh control circuit 350, a storage circuit 352, a data input/output circuit 360, a command/address (CA) buffer 372, a command decoder 373, an address generation circuit 374, a refresh counter 375, and a target address generation circuit 376. The memory cell region 310, the row control circuit 320, the column control circuit 330, the storage circuit 352, the data input/output circuit 360, the CA buffer 372, the command decoder 373, the address generation circuit 374, the refresh counter 375, and the target address generation circuit 376 of FIG. 8 may have substantially the same configurations as the components of the memory device 200A of FIG. 6.

The active region determination circuit 340 may count the number of times, which each memory region is activated according to the active command ACT and the row address RADD, to generate active counting values CNT_SUB0 to CNT_SUBn for respective memory regions of the memory device 200B. The active region determination circuit 340 may selectively initialize the active counting values CNT_SUB # according to reset signals RFM_R # that are provided from the refresh control circuit 350, # being an integer between 0 and 'n'.

Referring to FIG. 9, the active region determination circuit 340 may include a sub-decoder 342, an active combiner 344 and a plurality of sub-counters 346_C0 to 346_Cn.

The sub-decoder 342 may decode the row address RADD to generate a plurality of sub-region signals SUB0 to SUBn for designating the respective memory regions. The active combiner 344 may respectively output the plurality of sub-region signals SUB0 to SUBn as a plurality of sub-region activation signals ACT_SUB0 to ACT_SUBn whenever the active command ACT is input. The active combiner 344 may be implemented with a plurality of AND gates for performing a logic AND operation on the active command ACT and the sub-region signals SUB0 to SUBn, respectively. The sub-counters 346_C0 to 346_Cn may correspond to the memory regions and may generate the active counting values CNT_SUB0 to CNT_SUBn by increasing a corresponding active counting value by "+1" each time a corresponding sub-region activation signal is activated. Each of the sub-counters 346_C0 to 346_Cn may be initialized when a corresponding reset signal among the reset signals RFM_R0 to RFM_Rn is activated.

With the above configuration, the active region determination circuit 340 may generate, based on the row address RADD and the active command ACT, the active counting values CNT_SUB0 to CNT_SUBn for respective memory regions of the memory device 200B. In the second embodiment of the present invention, the active region determination circuit 340 may provide the active counting values CNT_SUB0 to CNT_SUBn for respective memory regions to the refresh control circuit 350 as a memory information signal M_INFO.

The refresh control circuit 350 may activate a first internal command signal IREF according to a normal refresh command REF and activate a second internal command signal IRFM according to a refresh management command RFM, while activating the first internal command signal IREF according to the refresh management command RFM based on the memory information signal M_INFO and increasing a replacement counting value CNT_INFO. The refresh control circuit 350 may initialize the replacement counting value CNT_INFO according to a counting output signal CNT_OUT provided from the storage circuit 352. Depending on an embodiment, the refresh control circuit 350 may set a threshold value in advance and generate an alert signal ALERT when the replacement counting value CNT_INFO reaches the threshold value. The refresh control circuit 350 may provide the alert signal ALERT to the memory controller through a separate pad. In the second embodiment of the present invention, the refresh control circuit 350 may activate a reset signal corresponding to an active counting value reaching a target number among the reset signals RFM_R0 to RFM_Rn according to the second internal command signal IRFM.

Figure 10:
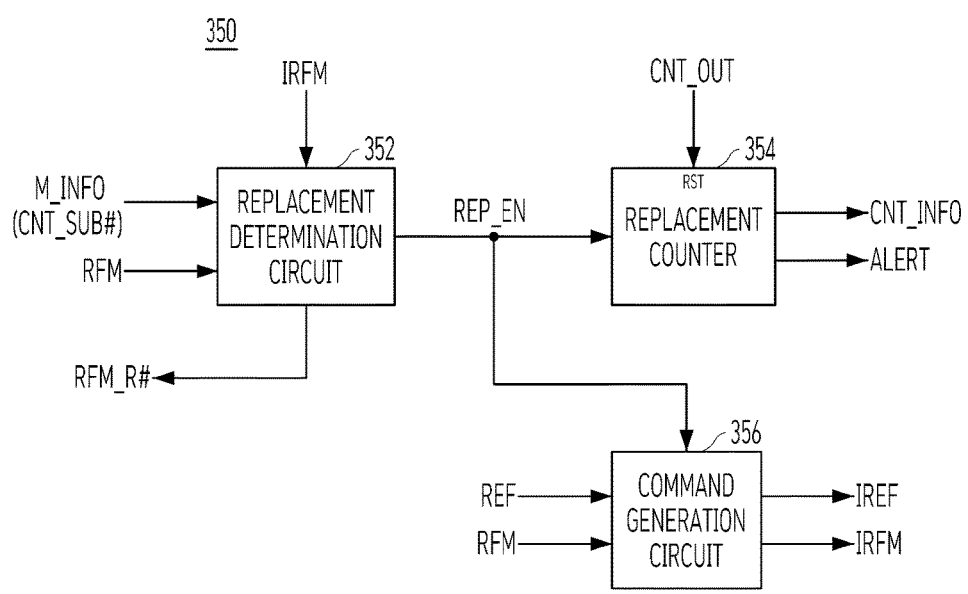
FIG. 10 is a detailed configuration diagram illustrating a refresh control circuit of FIG. 8.

FIG. 10 is a detailed configuration diagram illustrating the refresh control circuit 350 of FIG. 8.

Referring to FIG. 10, the refresh control circuit 350 may include a replacement determination circuit 352, a replacement counter 354, and a command generation circuit 356. The replacement counter 354 and the command generation circuit 356 of FIG. 10 may have substantially the same configurations as the components of the refresh control circuit 240 of FIG. 7A.

The replacement determination circuit 352 may determine whether to activate a replacement enable signal REP_EN based on the memory information signal M_INFO, when the refresh management command RFM is input, where the memory information signal M_INFO includes the active counting values CNT_SUB0 to CNT_SUBn for respective memory regions. For example, the replacement determination circuit 352 may determine that a row-hammer response is less required when one of the active counting values CNT_SUB0 to CNT_SUBn does not reach the target number, and activate the replacement enable signal REP_EN according to the refresh management command RFM. On the contrary, the replacement determination circuit 352 may determine that a row-hammer response is required when one of the active counting values CNT_SUB0 to CNT_SUBn reaches the target number and may deactivate the replacement enable signal REP_EN according to the refresh management command RFM. In this case, the replacement determination circuit 352 may activate a reset signal corresponding to an active counting value reaching the target number among the reset signals RFM_R0 to RFM_Rn, according to the second internal command signal IRFM.

As described above, the memory device 200B according to the second embodiment of the present invention may replace the target refresh operation with the normal refresh operation based on the memory information signal M_INFO including the active counting values CNT_SUB0 to CNT_SUBn for respective memory regions of the memory device 200B. The memory device 200B may count the number of times of the replacing, store it as the replacement counting value CNT_INFO, and output the replacement counting value CNT_INFO to the memory controller in response to the readout command MRR. In addition, when the replacement counting value CNT_INFO reaches the threshold value, the memory device 200B may generate the alert signal ALERT and output it to the memory controller.

Figure 11:
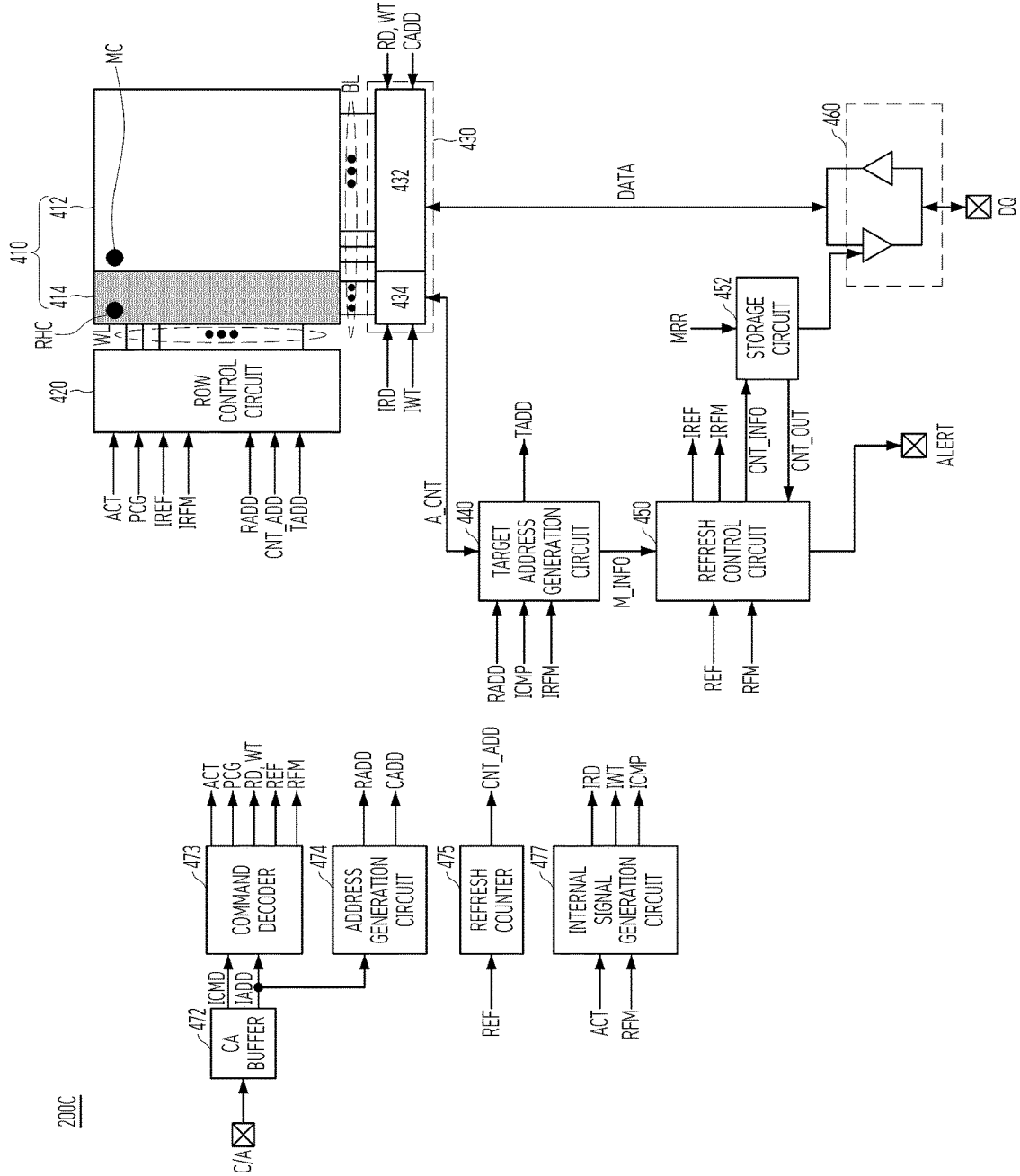
FIG. 11 is a detailed block diagram illustrating a memory device in accordance with a third embodiment of the present invention.
Figure 12:
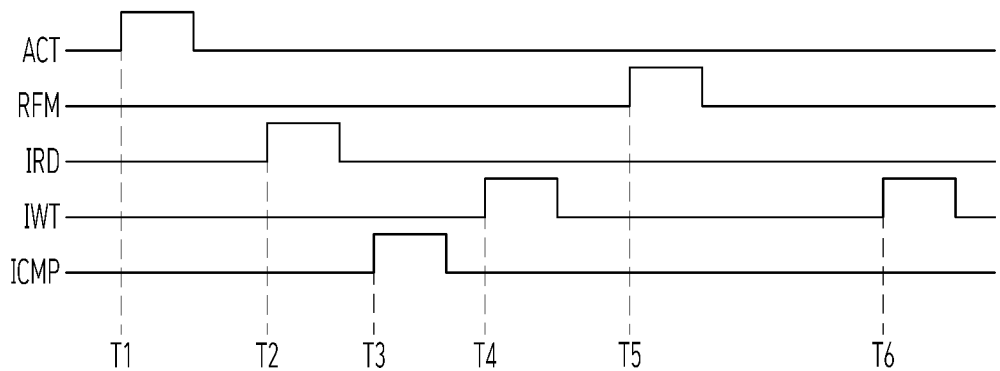
FIG. 12 is a waveform diagram for describing an operation of an internal signal generation circuit of FIG. 11.
Figure 13:
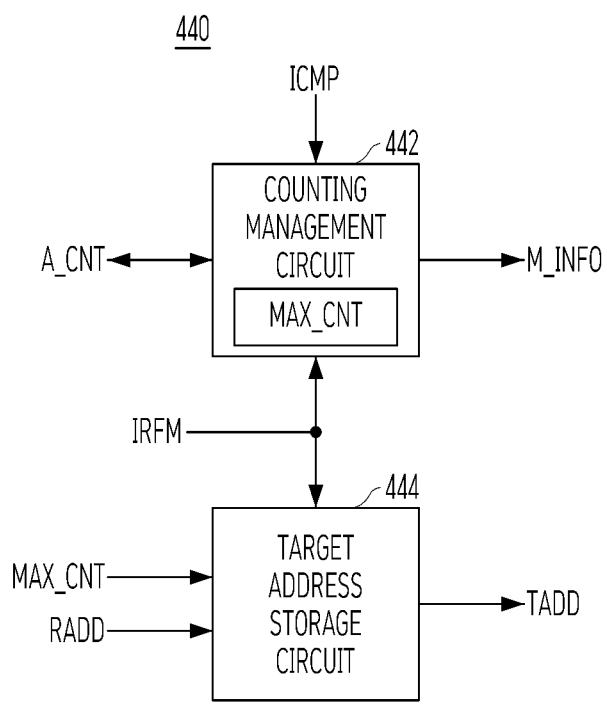
FIG. 13 is a detailed configuration diagram illustrating a target address generation circuit of FIG. 11.

FIG. 11 is a detailed block diagram illustrating a memory device 200C in accordance with a third embodiment of the present invention. FIG. 12 is a waveform diagram for describing an operation of an internal signal generation circuit 477 of FIG. 11. FIG. 13 is a detailed configuration diagram illustrating a target address generation circuit 440 of FIG. 11.

Referring to FIG. 11, the memory device 200C may include a memory cell region 410, a row control circuit 420, a column control circuit 430, the target address generation circuit 440, a refresh control circuit 450, a storage circuit 452, a data input/output circuit 460, a command/address (CA) buffer 472, a command decoder 473, an address generation circuit 474, a refresh counter 475, and the internal signal generation circuit 477. The storage circuit 452, the data input/output circuit 460, the CA buffer 472, the command decoder 473, the address generation circuit 474, and the refresh counter 475 of FIG. 11 may have substantially the same configurations as the components of the memory device 200A of FIG. 6.

The memory cell region 410 may include a plurality of memory cells MC and RHC respectively coupled to a plurality of rows WL and a plurality of columns BL. In accordance with the third embodiment, the memory cell region 410 may be divided into a normal cell region 412 and a row-hammer (RH) cell region 414. A plurality of normal cells MC may be arranged in an array type in the normal cell region 412, and a plurality of row-hammer cells RHC may be arranged in an array type in the row-hammer cell region 414. The plurality of normal cells MC and the plurality of row-hammer cells RHC may be coupled to each of the rows WL. The plurality of normal cells MC may store normal data DATA including user data, and the plurality of row-hammer cells RHC may store counting data A_CNT for storing the number of accesses to a corresponding row.

The internal signal generation circuit 477 may sequentially generate an internal read signal IRD, an internal comparison signal ICMP, and an internal write signal IWT when an active command ACT is input. When a refresh management command RFM is input, the internal signal generation circuit 477 may generate the internal write signal IWT to initialize the row-hammer cells RHC of a target row. For example, referring to FIG. 12, when the active command ACT is input at a time of T1, the internal signal generation circuit 477 may generate the internal read signal IRD at a time of T2. After that, the internal signal generation circuit 477 may generate the internal comparison signal ICMP at a time of T3 and generate the internal write signal IWT at a time of T4. In addition, when the refresh management command RFM is input at a time of T5, the internal signal generation circuit 477 may generate the internal write signal IWT at a time of T6.

Referring back to FIG. 11, the row control circuit 420 may be coupled to the normal cells MC in the normal cell region 412 and the row-hammer cells RHC in the row-hammer cell region 414, through the rows WL. The row control circuit 420 may select or activate at least one row selected by a row address RADD when the active command ACT is input and may deactivate the activated row when the precharge command PCG is input. The row control circuit 420 may perform the normal refresh operation on a row corresponding to a counting address CNT_ADD in response to a first internal command signal IREF. The row control circuit 420 may perform the target refresh operation on one or more victim rows selected by a target address TADD in response to a second internal command signal IRFM.

The column control circuit 430 may include a first column control circuit 432 corresponding to the normal cell region 412, and a second column control circuit 434 corresponding to the row-hammer cell region 414. The first column control circuit 432 and the second column control circuit 434 may be coupled to the normal cells MC of the normal cell region 412 and the row-hammer cells RHC of the row-hammer cell region 414, respectively through the separated columns BL.

The first column control circuit 432 may select some columns among the columns BL, according to a column address CADD, read out the normal data DATA from the normal cells MC through the selected columns in response to the read command RD, and write the normal data DATA provided from the memory controller into the normal cells MC through the selected columns in response to the write command WT. The first column control circuit 432 may be coupled to a data pad through the data input/output circuit 460 to transmit and receive data DQ to and from the memory controller.

The second column control circuit 434 may read out the counting data A_CNT from the row-hammer cells RHC of the row-hammer cell region 414, to output the read counting data A_CNT to the target address generation circuit 440, according to the internal read signal IRD. The second column control circuit 434 may receive updated counting data A_CNT from the target address generation circuit 440 to write back the updated counting data A_CNT to the row-hammer cells RHC of the row-hammer cell region 414, according to the internal write signal IWT.

The target address generation circuit 440 may update the counting data A_CNT provided from the second column control circuit 434. For example, the target address generation circuit 440 may increase a value of the counting data A_CNT by "+1". The target address generation circuit 440 may provide the updated counting data A_CNT to the second column control circuit 434. Further, the target address generation circuit 440 may compare the counting data A_CNT with a pre-stored maximum counting data (MAX_CNT of FIG. 13) according to the internal comparison signal ICMP and may update the maximum counting data MAX_CNT and store the target address TADD corresponding to the row address RADD, according to the comparison result. The target address generation circuit 440 may output the stored target address TADD to the row control circuit 420, according to the second internal command signal IRFM. The target address generation circuit 440 may initialize the maximum counting data MAX_CNT and the target address TADD after outputting the stored target address TADD.

Referring to FIG. 13, the target address generation circuit 440 may include a counting management circuit 442 and a target address storage circuit 444.

The counting management circuit 442 may increase the counting data A_CNT by "+1" when the counting data A_CNT is input, provide the updated counting data A_CNT to the second column control circuit 434. The counting management circuit 442 may compare the counting data A_CNT with the pre-stored maximum counting data MAX_CNT according to the internal comparison signal ICMP to update the maximum counting data MAX_CNT according to the comparison result. The counting management circuit 442 may provide the updated maximum counting data MAX_CNT to the refresh control circuit 450 as a memory information signal M_INFO. The counting management circuit 442 may initialize the maximum counting data MAX_CNT according to the second internal command signal IRFM.

When the maximum counting data MAX_CNT is updated, the target address storage circuit 444 may store the row address RADD as the target address TADD. The target address storage circuit 444 may output the stored target address TADD to the row control circuit 420 according to the second internal command signal IRFM and then initialize the stored target address TADD.

With the above configuration, the target address generation circuit 440 may generate the maximum counting data MAX_CNT and the target address TADD corresponding thereto, using the counting data A_CNT read from a row, which is selected by the row address RADD according to the active command ACT among the plurality of rows WL. In the third embodiment of the present invention, the target address generation circuit 440 may provide the maximum counting data MAX_CNT to the refresh control circuit 450 as the memory information signal M_INFO.

Referring back to FIG. 11, the refresh control circuit 450 may activate the first internal command signal IREF according to the normal refresh command REF and activate the second internal command signal IRFM according to the refresh management command RFM, while activating the first internal command signal IREF according to the refresh management command RFM based on a memory information signal M_INFO and increasing the replacement counting value CNT_INFO. The refresh control circuit 450 of FIG. 11 may have substantially the same configuration as the refresh control circuit 240 described in FIG. 7A. That is, the refresh control circuit 450 may include a replacement determination circuit 242, a replacement counter 244, and a command generation circuit 246. However, in the third embodiment of the present invention, the replacement determination circuit 242 may determine that a row-hammer response is less required when the maximum counting data MAX_CNT does not exceed a specific threshold and may activate a replacement enable signal REP_EN.

As described above, the memory device 200C according to the third embodiment of the present invention may replace the target refresh operation with the normal refresh operation based on the memory information signal M_INFO including the maximum counting data MAX_CNT, i.e., the number of activations of an attack row corresponding to the target address TADD. The memory device 200C may count the number of times of the replacing, store it as the replacement counting value CNT_INFO, and output the replacement counting value CNT_INFO to the memory controller in response to the readout command MRR. In addition, when the replacement counting value CNT_INFO reaches a threshold value, the memory device 200C may generate the alert signal ALERT and output it to the memory controller.

Hereinafter, referring to FIGS. 1 to 14, an operation of the memory device 200 according to an embodiment of the present invention will be described.

Figure 14:
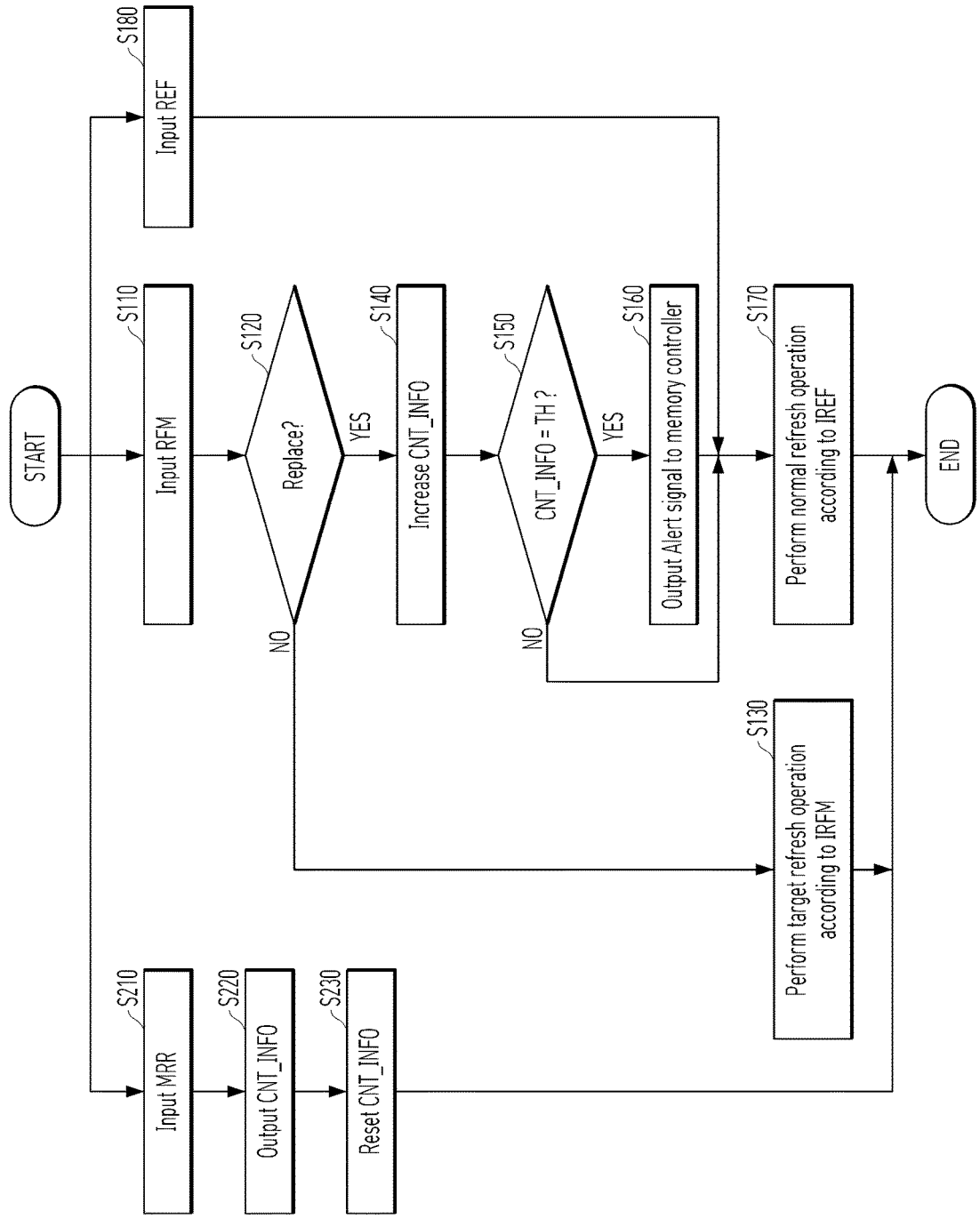
FIG. 14 is a flow chart for describing an operation of a memory device in accordance with an embodiment of the present invention.

FIG. 14 is a flow chart for describing an operation of the memory device 200 in accordance with an embodiment of the present invention.

Referring to FIG. 14, the memory controller 100 may issue the normal refresh command REF or the refresh management command RFM.

The memory device 200 may receive the refresh management command RFM from the memory controller 100 (at S110). The memory device 200 may determine whether to replace the target refresh operation with the normal refresh operation based on the memory information signal M_INFO (at S120). In the first embodiment, the refresh control circuit 240 may determine whether the current memory device needs a row-hammer response based on the memory information signal M_INFO including at least one of the temperature information and the product code information of the memory device 200A. In the second embodiment, the refresh control circuit 350 may determine whether the current memory device needs a row-hammer response based on the memory information signal M_INFO including the number of activations for each memory region. In the third embodiment, the refresh control circuit 450 may determine whether the current memory device needs a row-hammer response based on the memory information signal M_INFO including the number of activations of the attack row for the target refresh operation.

When it is determined that the current memory device needs the row-hammer response ("NO" of S120), the refresh control circuits 240, 350, and 450 may activate the second internal command signal IRFM according to the refresh management command RFM. The row control circuits 240, 350, and 450 may perform the target refresh operation according to the second internal command signal IRFM (at S130), for refreshing the victim rows selected by the target address TADD, thereby preventing a row-hammer phenomenon.

On the other hand, when it is determined that the current memory device needs less row-hammer response ("YES" of S120), the refresh control circuits 240, 350, and 450 may activate the first internal command signal IREF according to the refresh management command RFM and increase the replacement counting value CNT_INFO (at S140). The storage circuits 250, 352, and 452 may store the replacement counting value CNT_INFO generated by the refresh control circuits 240, 350, and 450. When the replacement counting value CNT_INFO reaches the threshold value TH ("YES" of S150), the refresh control circuits 240, 350, and 450 may generate the alert signal ALERT and output the alert signal ALERT to the memory controller 100 (at S160).

On the other hand, when the replacement counting value CNT_INFO does not reach the threshold value TH ("NO" of S150), the refresh control circuits 240, 350, and 450 may activate the first internal command signal IREF instead of the second internal command signal IRFM, according to the refresh management command RFM. The row control circuits 220, 320, and 420 may perform the normal refresh operation according to the first internal command signal IREF (at S170), for sequentially refreshing the rows corresponding to the counting address CNT_ADD.

The memory device 200 may receive the normal refresh command REF from the memory controller 100 (at S180). The refresh control circuits 240, 350, and 450 may activate the first internal command signal IREF in response to the normal refresh command REF. The row control circuits 220, 320, and 420 may perform the normal refresh operation according to the first internal command signal IREF (at S170), for sequentially refreshing the rows corresponding to the counting address CNT_ADD.

The memory controller 100 may issue the mode register command MRR (at S210).

The storage circuits 250, 352, and 452 of the memory device 200 may provide the replacement counting value CNT_INFO stored therein, according to the mode register command MRR (i.e., the readout command) to the memory controller 100 in the form of data DQ (at S220). The storage circuits 250, 352, and 452 may activate the counting output signal CNT_OUT after the replacement counting value CNT_INFO is output. Accordingly, the refresh control circuits 240, 350, and 450 may initialize the replacement counting value CNT_INFO according to the counting output signal CNT_OUT (at S230).

Figure 15:
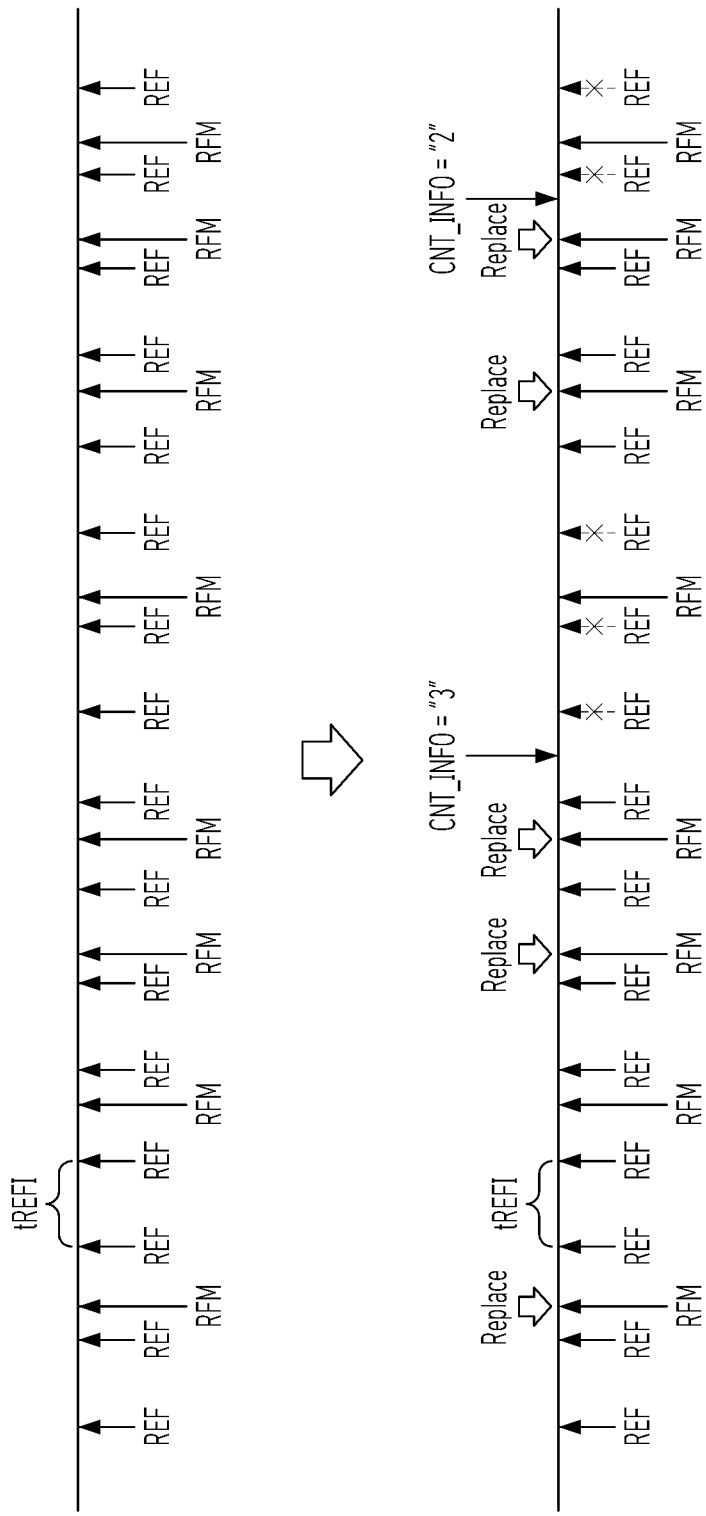
FIGS. 15 and 16 are timing diagrams for describing an operation of a memory controller in accordance with an embodiment of the present invention.
Figure 16:
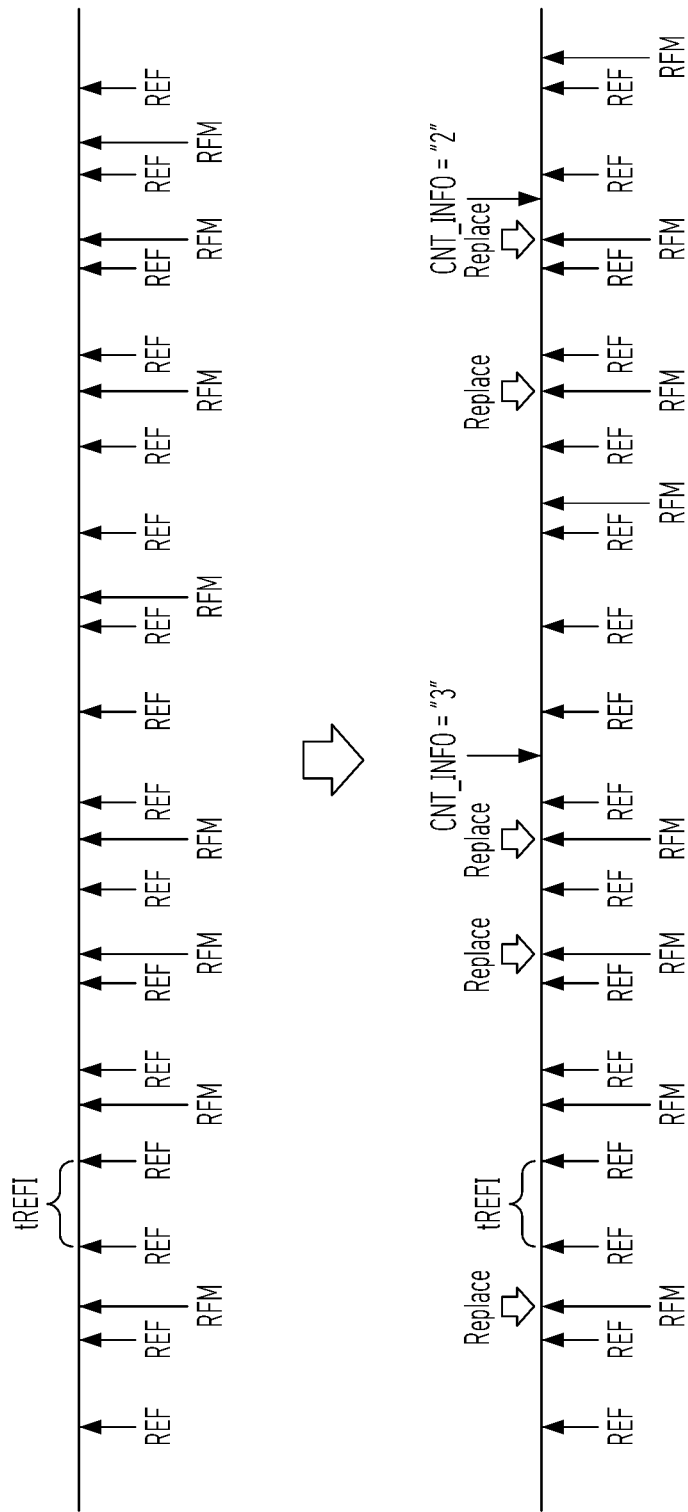

FIGS. 15 and 16 are timing diagrams for describing an operation of the memory controller 100 in accordance with an embodiment of the present invention.

Referring to FIG. 15, a case where the issue frequency of the normal refresh command REF is adjusted according to the replacement counting value CNT_INFO, is shown.

The memory controller 100 may periodically issue the normal refresh command REF at each refresh interval tREFI, or non-periodically issue the refresh management command RFM.

When the target refresh operation according to the refresh management command RFM is deemed unnecessary based on the memory information signal M_INFO, the memory device 200 may replace the target refresh operation with the normal refresh operation according to the refresh management command RFM, count the number of times of the replacing, and provide the replacement count value CNT_INFO to the memory controller 100.

For example, when the replacement counting value CNT_INFO of "3" is provided from the memory device 200, the memory controller 100 may omit the issuance of the normal refresh command REF three times in proportion to the replacement counting value CNT_INFO of "3". Accordingly, the issue frequency of the normal refresh command REF may be reduced. In addition, when the replacement counting value CNT_INFO of "2" is provided from the memory device 200, the memory controller 100 may omit the issuance of the normal refresh command REF twice in proportion to the replacement counting value CNT_INFO of "2". Accordingly, the issue frequency of the normal refresh command REF may be reduced.

In the embodiments of the present invention, it has been described to reduce the issue frequency of the normal refresh command REF in proportion to the replacement counting value CNT_INFO, but the proposed invention is not limited thereto, so the issue frequency of the normal refresh command REF may be reduced in various ways.

By reducing the number of times, which the normal refresh command REF is issued based on the number of times replaced, the memory controller 100 may prevent the power consumption due to unnecessary refresh operations while maximizing the efficiency of the command/address bus.

Referring to FIG. 16, a case where the issue frequency of the refresh management command RFM is adjusted according to the replacement counting value CNT_INFO, is shown.

Similarly, when the replacement counting value CNT_INFO is provided from the memory device 200, the memory controller 100 may reduce the issue frequency of the refresh management command RFM by increasing the target number according to the replacement counting value CNT_INFO. By reducing the number of times, which the refresh management command RFM is issued based on the number of times replaced, the memory controller 100 may prevent the power consumption due to unnecessary refresh operations while maximizing the efficiency of the command/address bus.

Various embodiments of the present disclosure have been described in the drawings and specification. Although specific terminologies are used here, the terminologies are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. The embodiments may be combined to form additional embodiments.

It should be noted that although the technical spirit of the disclosure has been described in connection with embodiments thereof, this is merely for description purposes and should not be interpreted as limiting. It should be appreciated by one of ordinary skill in the art that various changes may be made thereto without departing from the technical spirit of the disclosure and the following claims.

For example, for the logic gates and transistors provided as examples in the above-described embodiments, different positions and types may be implemented depending on the polarity of the input signal.

What is claimed is:

1. A memory system comprising:
a memory controller configured to:
issue a normal refresh command and a refresh management command, and
adjust, based on a replacement counting value, an issuance frequency of at least one of the normal refresh command and the refresh management command; and
a memory device configured to:
perform a first refresh operation in response to the normal refresh command and a second refresh operation in response to the refresh management command, and
when the refresh management command is received, selectively perform the first refresh operation instead of performing the second refresh operation according to a memory information signal,
count a number of times of the replacing to generate the replacement counting value, and
provide the replacement counting value.

2. The memory system of claim 1, wherein the memory controller is configured to:
reduce the issuance frequency of the normal refresh command in proportion to the replacement counting value, or
reduce the issuance frequency of the refresh management command according to the replacement counting value.

3. The memory system of claim 1, wherein the memory information signal includes at least one of temperature information of the memory device, product code information of the memory device, a number of activations per memory regions of the memory device, and a number of activations of an aggressor row for the second refresh operation.

4. The memory system of claim 1,
wherein the memory device is further configured to provide an alert signal when the replacement counting value reaches a threshold value, and
wherein the memory controller omits issuing the refresh management command a certain number of times in response to the alert signal.

5. The memory system of claim 1,
wherein the first refresh operation is a normal refresh operation for sequentially refreshing a plurality of rows of the memory device, and
wherein the second refresh operation is a target refresh operation for refreshing one or more victim rows vulnerable to a row-hammer attack.

6. The memory system of claim 1, wherein the memory controller includes:
an active counter configured to count a number of inputs of an active command to generate an active counting value;
a normal command issue circuit configured to:
issue the normal refresh command at each refresh interval, and
adjust the issuance frequency of the normal refresh command according to the replacement counting value; and
a target command issue circuit configured to issue the refresh management command when the active counting value reaches a target number.

7. The memory system of claim 6,
wherein the memory device is further configured to output an alert signal when the replacement counting value reaches a threshold value, and
wherein the target command issue circuit omits issuing the refresh management command a certain number of times in response to the alert signal.

8. The memory system of claim 1, wherein the memory controller includes:
an active counter configured to count a number of inputs of an active command for each memory region of the memory device to generate a plurality of active counting values;
a normal command issue circuit configured to:
issue the normal refresh command at each refresh interval, and
adjust the issuance frequency of the normal refresh command according to the replacement counting value; and
a target command issue circuit configured to issue the refresh management command according to the plurality of active counting values.

9. The memory system of claim 1, wherein the memory controller includes:
an active counter configured to count a number of inputs of an active command to generate an active counting value;
a normal command issue circuit configured to issue the normal refresh command at each refresh interval; and
a target command issue circuit configured to:
issue the refresh management command when the active counting value reaches a target number, and
adjust the issuance frequency of the refresh management command according to the replacement counting value.

10. A memory device comprising:
a memory cell region including a plurality of rows;
a control circuit configured to:
perform a first refresh operation on the memory cell region in response to a normal refresh command and a second refresh operation on the memory cell region in response to the refresh management command,
upon reception of the refresh management command, selectively perform the first refresh operation instead of performing the second refresh operation, and
count a number of times of the replacing to generate a replacement counting value; and
a storage circuit configured to store the replacement counting value and output the stored replacement counting value to outside according to a readout command.

11. The memory device of claim 10, wherein the control circuit includes:
a refresh control circuit configured to:
activate a first internal command signal according to the normal refresh command,
activate a second internal command signal according to the refresh management command,
activate, based on a memory information signal, the first internal command signal according to the refresh management command, and
increase the replacement counting value; and
a row control circuit configured to perform the first refresh operation according to the first internal command signal and perform the second refresh operation according to the second internal command signal.

12. The memory device of claim 11, wherein the memory information signal includes at least one of temperature information of the memory device and product code information of the memory device.

13. The memory device of claim 11, further comprising an active region determination circuit configured to provide, based on an active command and a row address, the memory information signal corresponding to a number of activations per memory regions of the memory device.

14. The memory device of claim 11, further comprising a target address generation circuit configured to provide the memory information signal corresponding to a maximum counting data generated by using counting data read from a row selected according to an active command among the plurality of rows.

15. The memory device of claim 11, wherein the refresh control circuit is configured to output an alert signal when the replacement counting value reaches a threshold value.

16. The memory device of claim 11,
wherein the refresh control circuit includes:
a replacement determination circuit configured to generate, when the refresh management command is input, a replacement enable signal based on the memory information signal;
a replacement counter configured to:
increase the replacement counting value according to the replacement enable signal, and
generate an alert signal when the replacement counting value reaches a threshold value; and
a command generation circuit configured to activate the first internal command signal according to the normal refresh command and activate the second internal command signal according to the refresh management command,
wherein the command generation circuit is further configured to activate, according to the replacement enable signal, the first internal command signal while preventing the second internal command signal from being activated.

17. The memory device of claim 16, wherein the storage circuit is further configured to output, after the outputting of the stored replacement counting value, a counting output signal to reset the replacement counter.

18. The memory device of claim 16, wherein the threshold value depends on a number of times that a pulled-in refresh operation is set to be performed or a number of times that a postponed refresh operation is set to be performed.

19. The memory device of claim 10, further comprising:
a refresh counter configured to generate a counting address whose value increases sequentially according to the normal refresh command; and
a target address generation circuit configured to generate a target address by sampling a row address according to an active command,
wherein the control circuit performs the first refresh operation based on the counting address and performs the second refresh operation based on the target address.

20. The memory device of claim 10, further comprising:
a refresh counter configured to generate a counting address whose value increases sequentially according to the normal refresh command; and
a target address generation circuit configured to generate a target address by using counting data read from a row selected according to an active command among the plurality of rows,
wherein the control circuit performs the first refresh operation based on the counting address and performs the second refresh operation based on the target address.

21. An operating method of a memory system, the operating method comprising:
issuing, by a memory controller, a normal refresh command or a refresh management command;
performing, by a memory device, a first refresh operation in response to the normal refresh command or a second refresh operation in response to the refresh management command, and when the refresh management command is issued, selectively performing the first refresh operation instead of performing the second refresh operation according to a memory information signal;

counting, by the memory device, a number of times of the replacing to generate a replacement counting value;

providing, by the memory device, the replacement counting value; and adjusting, by the memory controller, an issuance frequency of at least one of the normal refresh command and the refresh management command based on the replacement counting value.

22. The operating method of claim 21, wherein the adjusting includes:

reducing the issuance frequency of the normal refresh command in proportion to the replacement counting value, or reducing the issuance frequency of the refresh management command according to the replacement counting value.

23. The operating method of claim 21, wherein the memory information signal includes at least one of temperature information of the memory device, product code information of the memory device, a number of activations per memory regions of the memory device, and a number of activations of an aggressor row for the second refresh operation.

24. The operating method of claim 21, further comprising providing, by the memory device, an alert signal when the replacement counting value reaches a threshold value; and wherein the issuing includes omitting, by the memory controller, the issuing of the refresh management command a certain number of times in response to the alert signal.

25. The operating method of claim 21, wherein the providing includes:

storing the replacement counting value;

outputting the stored replacement counting value according to a readout command provided from the memory controller; and initializing the stored replacement counting value.

26. The operating method of claim 21, wherein the first refresh operation is a normal refresh operation for sequentially refreshing a plurality of rows of the memory device, and wherein the second refresh operation is a target refresh operation for refreshing one or more victim rows vulnerable to a row-hammer attack.

* * * * *